US009262095B2

(12) United States Patent
Sugimoto et al.

(10) Patent No.: US 9,262,095 B2
(45) Date of Patent: Feb. 16, 2016

(54) STORAGE SYSTEM COMPRISING MICROPROCESSOR LOAD DISTRIBUTION FUNCTION

(75) Inventors: Sadahiro Sugimoto, Yokohama (JP); Norio Shimozono, Machida (JP); Kazuyoshi Serizawa, Tama (JP)

(73) Assignee: HITACHI, LTD., Tokyo (JP)

( * ) Notice: Subject to any disclaimer, the term of this patent is extended or adjusted under 35 U.S.C. 154(b) by 853 days.

(21) Appl. No.: 13/588,226

(22) Filed: Aug. 17, 2012

(65) Prior Publication Data

US 2012/0311204 A1 Dec. 6, 2012

Related U.S. Application Data

(63) Continuation of application No. 11/429,527, filed on May 5, 2006, now Pat. No. 8,271,979.

(30) Foreign Application Priority Data

Mar. 17, 2006 (JP) .................................. 2006-073867

(51) Int. Cl.
  *G06F 9/46* (2006.01)
  *G06F 3/06* (2006.01)
  *G06F 9/50* (2006.01)
  *G06F 12/08* (2006.01)

(52) U.S. Cl.
  CPC .............. *G06F 3/0659* (2013.01); *G06F 3/061* (2013.01); *G06F 3/0631* (2013.01); *G06F 3/0658* (2013.01); *G06F 3/0689* (2013.01); *G06F 9/5027* (2013.01); *G06F 12/0866* (2013.01); *G06F 2209/509* (2013.01)

(58) Field of Classification Search
  None
  See application file for complete search history.

(56) References Cited

U.S. PATENT DOCUMENTS

| 5,121,479 | A | 6/1992 | O'Brien |
| 5,301,324 | A | 4/1994 | Dewey et al. |
| 5,835,938 | A | 11/1998 | Yamamoto et al. |
| 7,058,761 | B2 | 6/2006 | Nakamura et al. |
| 7,120,739 | B2 * | 10/2006 | Fujimoto .............. G06F 3/0607 370/395.7 |
| 2001/0054136 | A1 | 12/2001 | Ninomiya et al. |
| 2002/0065916 | A1 | 5/2002 | Ooe et al. |
| 2005/0033912 | A1 * | 2/2005 | Abe ...................... G06F 3/0605 711/114 |

(Continued)

FOREIGN PATENT DOCUMENTS

| EP | 1 612 672 A1 | 1/2004 |
| JP | 3503690 A | 8/1991 |

(Continued)

OTHER PUBLICATIONS

Japanese Office Action corresponding to Japanese Patent Application No. 2006-073867, dated Apr. 26, 2011.

(Continued)

*Primary Examiner* — Gregory A Kessler
(74) *Attorney, Agent, or Firm* — Sughrue Mion, PLLC

(57) ABSTRACT

Among a plurality of microprocessors 12, 32, when the load on a microprocessor 12 which performs I/O task processing of received I/O requests is equal to or greater than a first load, the microprocessor assigns at least an I/O task portion of the I/O task processing to another microprocessor 12 or 32, and the other microprocessor 12 or 32 executes at least the I/O task portion. The I/O task portion is a task processing portion comprising cache control processing, comprising the securing in cache memory 20 of a cache area, which is one area in cache memory 20, for storage of data.

10 Claims, 21 Drawing Sheets

(56) References Cited

U.S. PATENT DOCUMENTS

| | | |
|---|---|---|
| 2005/0193167 A1 | 9/2005 | Eguchi et al. |
| 2006/0020767 A1 | 1/2006 | Sauermann |
| 2006/0031389 A1 | 2/2006 | Shimozono et al. |

FOREIGN PATENT DOCUMENTS

| | | |
|---|---|---|
| JP | 2005-242690 A | 6/1992 |
| JP | 2001-306365 A | 11/2001 |
| JP | 2003-208267 A | 7/2003 |
| JP | 2004-054845 A | 2/2004 |
| WO | 8907296 A1 | 8/1989 |

OTHER PUBLICATIONS

Japanese Office Action corresponding to Japanese Patent Application No. 2006-073867, dated Jan. 19, 2012.

Partial European Search Report, dated Aug. 6, 2009.

* cited by examiner

FIG. 5

WRITE ASSIGNMENT TABLE 61

| AREA ID | ASSIGNEE PROCESSOR ID |
|---|---|
| 0 | 1 |
| 1 | 0 |
| 2 | 7 |
| 3 | -1 (INVALID VALUE) |
| 4 | 2 |
| 5 | 3 |
| 6 | -1 |
| ⋮ | ⋮ |

FIG. 6

| A01 | A02 | A03 | A04 | A05 | A06 | A07 | A08 | A09 | A10 |
|---|---|---|---|---|---|---|---|---|---|
| A11 | A12 | A13 | A14 | ... | | | | | |

| 0 | 1 | 2 | 3 | 4 | 5 | 6 | 7 | 8 | 9 |
|---|---|---|---|---|---|---|---|---|---|
| 0 | 1 | 2 | 3 | ... | | | | | |

FIG. 7

OFFLOAD PERMISSION BITMAP 64

| PROCESSOR ID | 16 | 17 | 18 | 19 | ... |
|---|---|---|---|---|---|
| OFFLOAD PERMISSION BIT | 1 | 1 | 0 | 1 | ... |

STORAGE SYSTEM COMPRISING MICROPROCESSOR LOAD DISTRIBUTION FUNCTION

CROSS-REFERENCE TO PRIOR APPLICATION

This is a continuation of application Ser. No. 11/429,527 filed May 5, 2006. The entire disclosure of the prior application, application Ser. No. 11/429,527 is considered part of the disclosure of the accompanying continuation application and is hereby incorporated by reference.

This application relates to and claims priority from Japanese Patent Application No. 2006-73867, filed on Mar. 17, 2006 the entire disclosure of which is incorporated herein by reference.

BACKGROUND OF THE INVENTION

1. Field of the Invention

This invention relates to a storage system comprising a plurality of microprocessors.

2. Description of the Related Art

As one storage system of this type, for example, the storage system disclosed in Japanese Patent No. 3264465 is known. This storage system has a plurality of higher-level-connected logical devices, forming an interface to a higher-level system; storage devices; a plurality of storage-device-connected logical devices, forming an interface to the storage devices; and a cache memory device (a cache memory device shared by the plurality of higher-level-connected logical devices and by the plurality of storage-device-connected logical devices), which temporarily stores data transferred between these devices. In this storage system, the plurality of higher-level-connected logical devices, plurality of storage-device-connected logical devices, and the cache memory device are configured so as to be interconnected by means of a common bus shared by these devices. The higher-level-connected logical devices, storage-device-connected logical devices, cache memory device, and the common bus connecting these, are redundantly configured, with wiring provided for two separate systems, so that even when a fault occurs in one system, degenerate operation is possible using the other system.

SUMMARY OF THE INVENTION

Each of the higher-level-connected logical devices is equipped with one or a plurality of microprocessors. Each microprocessor executes input/output (hereafter "I/O") requests received from a higher-level device. At this time, if a plurality of I/O requests are concentrated at a single microprocessor, the load on this microprocessor becomes excessive, and there is the possibility that processing of I/O requests will be delayed.

Hence an object of this invention is to prevent the concentration of loads at a single microprocessor in a storage system comprising a plurality of microprocessors.

Further objects of the invention will become clear from the following explanations.

A storage system according to this invention comprises a plurality of communication ports, which exchange data with a higher-level device which issues I/O requests; a plurality of microprocessors, which execute I/O tasks which are processing of I/O requests received via the communication ports; a plurality of storage devices, which read and write data according to the I/O tasks; and cache memory, which temporarily stores data exchanged between the higher-level device and the plurality of storage devices. When, among the plurality of microprocessors, the load of a microprocessor which performs I/O tasks for received I/O requests is equal to or greater than a first load, the microprocessor assigns at least an I/O task portion among the I/O tasks to other microprocessors among the plurality of microprocessors, and the other microprocessors execute at least an I/O task portion (for example, in place of the microprocessor which is the assigner). The above I/O task portion is one portion of the I/O tasks, and is a portion comprising subtasks, among the I/O tasks, representing a high load (requiring much processing time) compared with subtasks which represent a low load for the microprocessor.

In a first mode of the invention, the I/O task portion is a task portion comprising cachecontrol tasks, comprising the securing, in cache memory, of one area in cache memory which is a cache area for storage of data.

In a second mode of the invention, the storage system further comprises a storage area for assignment control information, which is information representing one or more microprocessor IDs which can be selected as assignees. The microprocessor can reference the assignment control information, select one or more microprocessor IDs from among the microprocessor IDs represented in the referenced assignment control information, and set the other microprocessors corresponding to the selected microprocessor IDs as I/O task portion assignees. Each microprocessor when a load thereof is equal to or greater than a second load, can add microprocessor IDs thereof to the assignment control information; when a load thereof is less than the second load, each microprocessor can remove microprocessor IDs thereof from the assignment control information.

In a third mode of the invention, the storage system of the second mode of the invention further comprises two or more processor packages, and a plurality of microprocessors exist in the two or more processor packages. One of the processor packages is equipped with one or more microprocessors and an internal data bus, which is a path used for data communication with the cache memory. The assignment control information comprises write assignment control information and read assignment control information. The write assignment control information is assignment control information used to control assignment of write I/O task portions. A write I/O task portion is an I/O task portion when the I/O request is a write request. The read assignment control information is assignment control information used to control assignment of read I/O task portions. A read I/O task portion is an I/O task portion when the I/O request is a read request. When assignment of a write I/O task portion is performed, the load on the cache memory and the load on the internal data path are increased compared with a case in which the write I/O task portion assignment is performed without performing assignment of the write I/O task portion. Each microprocessor, upon updating the write assignment control information, can reduce its own microprocessor ID to the write assignment control information if either the cache memory load is equal to or greater than a certain memory load, or if the internal data path load of the processor package of the microprocessor is equal to or greater than a certain data path load, or both. Further, for each microprocessor, if the cache memory load is less than the certain memory load, or if the internal data path load of the processor package of the microprocessor is less than the certain data path load, or both, then the microprocessor can add its own microprocessor ID to the write assignment control information.

In a fourth mode of the invention, the plurality of microprocessors comprise two or more higher-level microprocessors, which are microprocessors which control communication between the higher-level device and the cache memory, and one or more lower-level microprocessors, which are microprocessors which control communication between the storage devices and the cache memory. The higher-level microprocessors can perform assignment to another higher-level microprocessor when the assigned object is a write I/O task portion, which is an I/O task portion when the I/O request is a write request, and on the other hand can perform assignment to a lower-level microprocessor when the assigned object is a read I/O task portion, which is an I/O task portion when the I/O request is a read request.

In a fifth mode of the invention, when in the storage system of the fourth mode of the invention a higher-level microprocessor assigns a write I/O task portion to another higher-level microprocessor, the higher-level microprocessor accumulates data according to the write request in a buffer, and the other higher-level microprocessor can write the data stored in the buffer to the cache memory.

In a sixth mode of the invention, in the storage system of the fifth mode of the invention, when a higher-level microprocessor does not assign a write I/O task portion, the higher-level microprocessor secures in cache memory a cache area (for example, locks a cache area) which is an area in the cache memory for storage of data, writes data to the secured cache area, and then, unlocks the secured cache area. The write I/O task portion is a cache control task comprising the securing of the cache area, and the unlocking of the secured cache area. When the higher-level microprocessor assigns the write I/O task portion to the other higher-level microprocessor, the higher-level microprocessor accumulates data according to the write request in a buffer and issues a prescribed request to the other higher-level microprocessor; the other higher-level microprocessor secures the cache area in the cache memory according to the prescribed request, writes the data stored in the buffer to the secured cache memory, unlocks the secured cache area, and returns a completion report; and the higher-level microprocessor, in response to the completion report, and can transmit the status to the higher-level device.

In a seventh mode of the invention, the storage system of the fourth mode of the invention further comprises a storage area in which is stored write assignment control information, which is information used to control assignment of write I/O task portions. A write request comprises access target information, which is information representing the access target. Area IDs, associated with a plurality of areas, and higher-level microprocessor IDs, are stored in the write assignment control information. Each area is a portion of an address range determined from the access target information included in a write request. The same higher-level microprocessor ID is periodically associated with a plurality of areas.

In an eighth mode of the invention, the storage system of the fourth mode of the invention further comprises a storage area in which is stored read assignment control information, which is information used to control assignment of read I/O task portions. There are a plurality of lower-level microprocessors; each lower-level microprocessor comprises a storage device connected to communicably, and a storage device not so connected. Two or more storage devices of the plurality of storage devices form a parity group; one or a plurality of logical units, which are logical storage devices, are formed for each parity group. For each communication port, a communication-capable logical unit, and one or more storage devices forming the logical unit, are determined. A read request comprises access target information which is information representing an access target; the access target information comprises a logical unit ID. In the read assignment control information are recorded, for each communication port, a communication port ID, ID of a logical unit which can communicate with the communication port, and ID of each lower-level microprocessor which can communicate with each storage device forming the logical unit. When a higher-level microprocessor assigns a read I/O task portion to a lower-level microprocessor, the higher-level microprocessor can assign the read I/O task portion to the ID of the communication port receiving the read request and to the lower-level microprocessor corresponding to a lower-level microprocessor ID associated with the logical unit ID comprised by the access target information of the read request.

In a ninth mode of the invention, in the storage system of the fourth mode of the invention, when a higher-level microprocessor does not perform assignment of a read I/O task portion, the higher-level microprocessor secures in the cache memory an area of cache memory, which is a cache area for storage of data and transmits the prescribed request to a lower-level microprocessor; the lower-level microprocessor, in response to the prescribed request, reads data from the storage device according to the read request, stores the data in the secured cache area, and returns a completion report; and the higher-level microprocessor, in response to the completion report, can read data from the secured cache area, transmit the data and status to the higher-level device, and unlock the secured cache area. The read I/O task portion is a cache control task comprising the securing of the cache area, and the unlocking of the secured cache area. When the higher-level microprocessor assigns the read I/O task portion to the lower-level microprocessor, the higher-level microprocessor issues a securing request to the lower-level microprocessor; the lower-level microprocessor, in response to the securing request, reads data from the storage device according to the read request, stores the data in the secured cache area, and returns a completion report; the higher-level microprocessor, in response to the completion report, reads data from the secured cache area, transmits the data and status to the higher-level device, unlocks the secured cache area, and transmits an unlock request to the lower-level microprocessor; and the lower-level microprocessor, in response to the unlock request, unlocks the secured cache area.

A tenth mode of the invention comprises a storage area for storing failure conditions information, which is information representing failure conditions for assignment of I/O task portions, a failure conditions update section for updating the failure conditions information when there is failure of assignment of an I/O task portion, and a load information output section for output of load information comprising the failure conditions information.

In an eleventh mode of the invention, in the storage system of the tenth mode of the invention, the plurality of microprocessors exist in two or more processor packages, and one processor package is provided with one or more microprocessors and an internal data path which is a path used in data communication with the cache memory. The load information further comprises processor load information, which is information representing the loads of each of the plurality of microprocessors, and internal data path load information, which is information representing the load on the internal data path for each processor package.

In a twelfth mode of the invention, the storage system of the tenth mode of the invention further comprises an expansion suggestion section which, when the failure conditions information represents failure conditions indicating failure at or exceeding prescribed failure conditions, displays information suggesting expansion of microprocessors.

Management calculation equipment of this invention comprises a reception section, which receives load information from the storage system, and an expansion suggestion section which, when received failure conditions information represents failure conditions indicating that failure has been equal to or exceeded prescribed failure conditions in the received load information, displays information suggesting expansion of microprocessors. The expansion suggestion section can display information suggesting expansion of microprocessors on the basis of the processor load information and the internal data path load information.

Each of the above portions may be described as means. Each of the above portions can be realized as hardware (for example, a circuit), as a computer program, or as a combination thereof (for example, one or a plurality of CPUs which read and execute computer programs). Each computer program can be read from a storage resource (for example, memory) comprised by a computer machine. The storage resource can be installed through recording media such as CD-ROMs or DVDs (Digital Versatile Discs), or can be downloaded via a communication network such as the Internet, a LAN or similar.

BRIEF DESCRIPTION OF THE DRAWINGS

FIG. 5 shows an example of the configuration of a write assignment table 61;

FIG. 6 is an explanatory diagram of an area described in an aspect;

FIG. 7 shows an example of the configuration of an offload permission bitmap 64;

DESCRIPTION OF THE PREFERRED EMBODIMENTS

Figure 1:
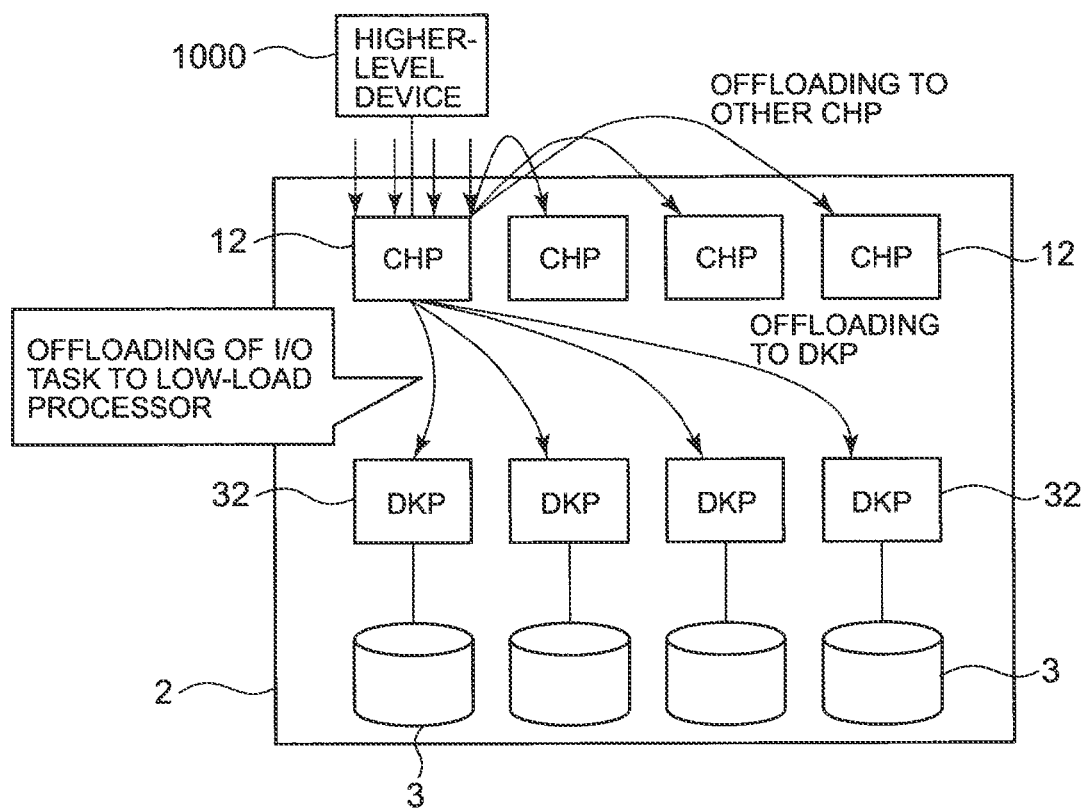
FIG. 1 shows one concept of the characteristics of a first aspect of the invention.

Below, aspects of the invention are explained, referring to the drawings.

FIG. 1 shows one concept of the characteristics of an aspect of the invention.

The storage system 2 comprises a plurality of storage devices 3; one or more microprocessors (hereafter abbreviated to "DKP") 32, which performs input/output of data to and from one or more storage devices 3; and a plurality of microprocessors (hereafter abbreviated to "CHP") 12 which perform processing of I/O requests issued from a higher-level device 1000. In this storage system 2, a CHP 12, having received an I/O request (write request or read request) from the higher-level device 1000, assigns at least the portion of the task of processing the I/O request (hereafter called an I/O task) which involves a high load (for example, cache hit judgment, described below, or cache locking), to another CHP 12 or to a DKP 32. By this means, the assigner CHP 12 is freed from execution of at least that part of processing of the I/O task involving a high load, and to this extent the load on the CHP 12 is lightened. In this specification, assignment of at least a high-load portion (hereafter abbreviated to "I/O task portion") of an I/O task by a microprocessor to another microprocessor may be called "offloading".

The CHP 12 can offload an I/O task portion to any other CHP 12 or DKP 32, but in this aspect, when the I/O request is a write request, at least a high-load portion (hereafter called the "write I/O task portion") of the task of I/O processing of a write request is offloaded to another CHP 12, whereas when the I/O request is a read request, at least a high-load portion (hereafter called the "read I/O task portion") of the task of I/O processing of a read request is offloaded to a DKP 32.

The higher-level device 1000 may be any device that issues I/O requests, and can for example by a host computer or another storage system.

Figure 2:
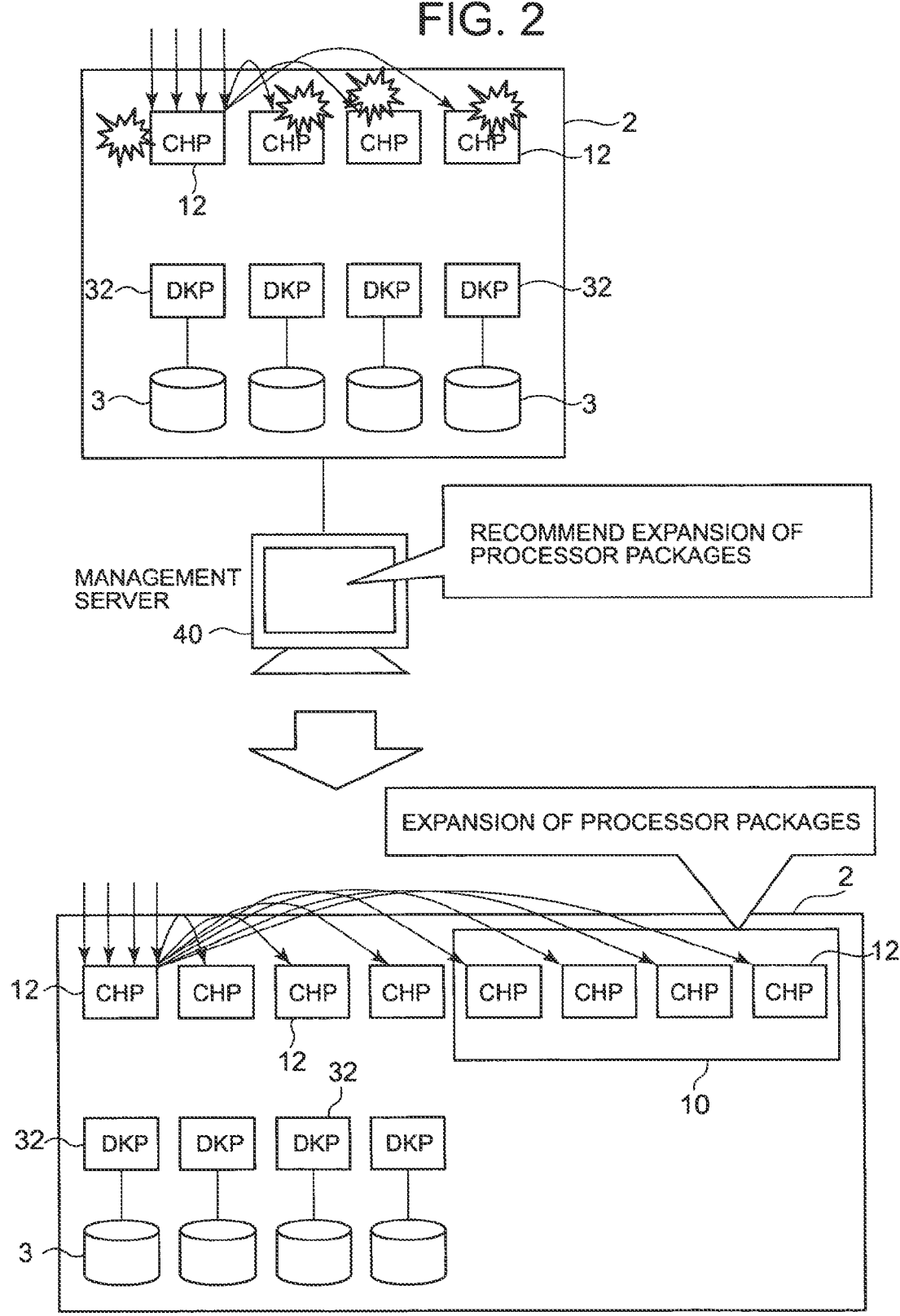
FIG. 2 shows a concept of other characteristics of an aspect.

FIG. 2 shows a concept of other characteristics of an aspect.

The storage system 2 holds, in a prescribed storage area, load information comprising information elements to specify the loads on each microprocessor 12, 32, and moreover updates this load information according to changes in the loads of each microprocessor 12, 32.

This storage system 2 is connected to a server 40 (hereafter called a management server) to manage the storage system 2. The management server 40 acquires load information managed by the storage system 2, and by analyzing the acquired load information, determines the loads of each CHP 12 and DKP 32 in the storage system 2. When the management server 40 find that the loads of all the assignee candidates (for example, all the microprocessors 12 and 32, or all the DKPs 32, or all the CHPs 12) are so high that I/O task portion offloading cannot be accepted (for example, when that the loads are higher than a prescribed threshold), expansion suggestion information (for example, a message specifying microprocessor expansion) is output, proposing expansion of microprocessors. A manager, upon seeing the expansion proposal information thus output, expands the storage system 2 by adding one or more microprocessors.

Specifically, when for example it is found that the load on all CHPs 12 is high, as shown in FIG. 2, then in this state there are no candidates for write I/O task portion assignees, and so expansion suggestion information to propose CHP expansion is output by the management server 40. The manager, upon seeing this expansion suggestion information, expands the storage system 2 with a processor package 10 (for example a CHA, described below) comprising one or more CHPs 12. Upon detecting expansion of a processor package 10, the CHP 12 which is the write I/O task portion assigner offloads the write I/O task portion to other CHPs 12 comprised by the expanded processor package 10.

Below, details of this aspect are explained.

Figure 3:
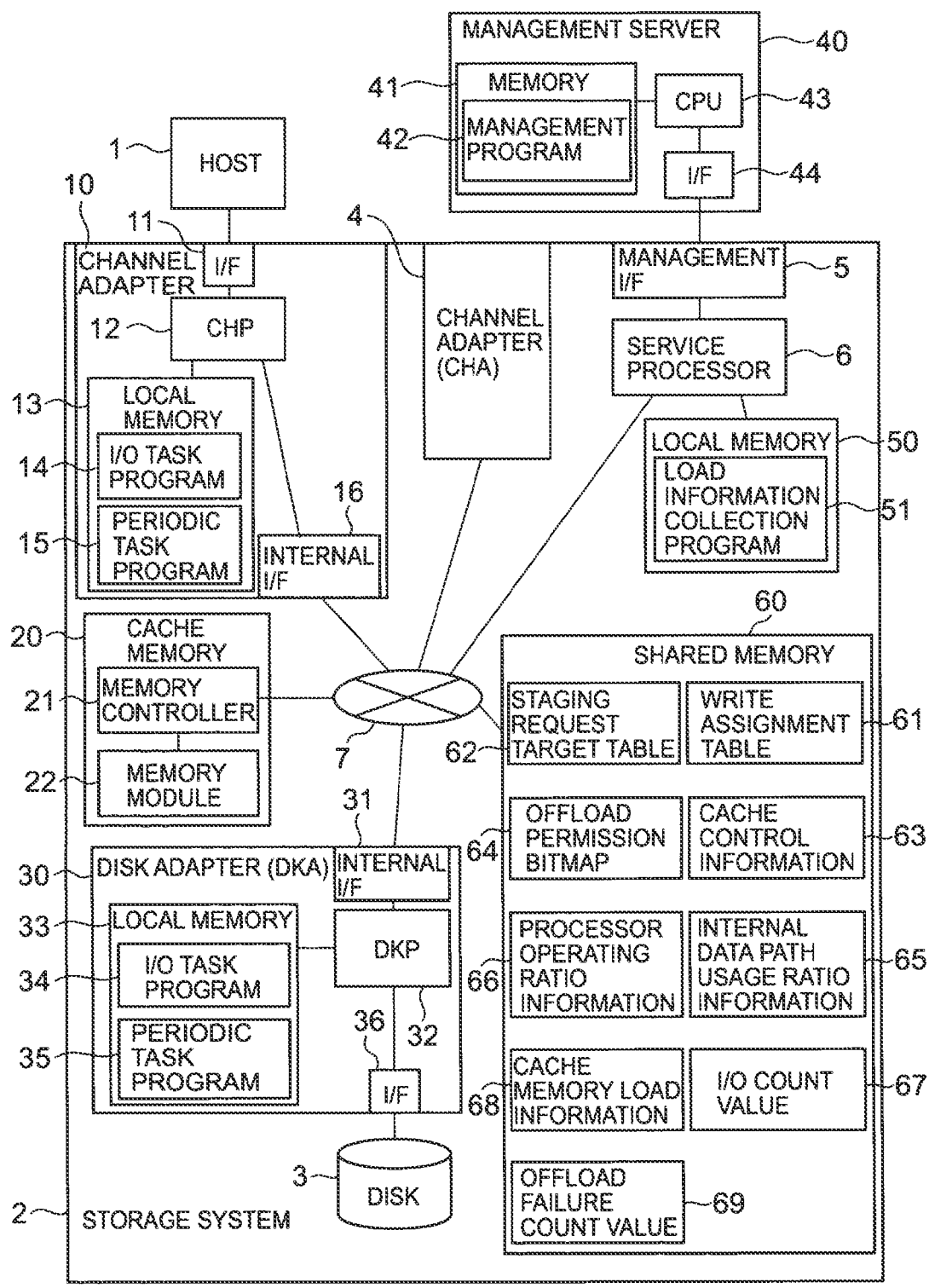
FIG. 3 shows an example of the configuration of a storage subsystem 2.

FIG. 3 shows an example of the configuration of a storage subsystem 2.

The storage system 2 is for example a disk array device comprising a plurality of storage devices 3, arranged in an array. The storage system 2 is connected to a host computer (hereafter simply called a host) 1, which is one type of higher-level device and which issues I/O requests, and a management server 40, described above, to manage the storage system 2. The storage system 2 comprises a controller portion and a plurality of storage devices 3 (in FIG. 3, only one is shown).

As storage devices 3, for example, hard disks, flexible disks, magnetic tape, semiconductor memory, optical discs, and other devices can be used. Below, storage devices 3 are assumed to be hard disk drives, which may be abbreviated to "disks". In the plurality of disks 3, a plurality of logical units (not shown) are prepared. A logical unit is obtained when two or more among the plurality of disks are grouped according to RAID (Redundant Array of Independent (or Inexpensive) Disks) rules; the storage resources of the two or more grouped disks 3 (hereafter called a parity group, although sometimes also called a RAID group or array group) are used to prepare a logical storage device called a logical unit.

The controller portion is a portion which controls processing performed by the storage system 2; specifically, the controller portion comprises one or more channel adapters (CHAs) 4, one or more disk adapters (DKAs) 30, a service processor (SVP) 6, a cache memory 20, shared memory 60, and an internal network 7.

Each of the CHAs 4 is a circuit board which performs data communication with the host 1. Each CHA 4 comprises a host I/F port 11, CHP 12, local memory for the CHP 12 (hereafter called local memory 13), and an internal I/F 16 connected to the internal network 7. In the local memory 13 are stored computer programs executed by the CHP 12, such as for example an I/O task program 14, and a periodic task program 15.

The number of CHAs 4, and the number of the above-described component elements comprised by one CHA 4, need only be one or greater. In particular, if there exist a plurality of CHPs 12 within the storage system 2, then there may be any number of CHAs 4, and any number of CHPs 12 within a single CHA 4. Host I/F ports 11 and CHPs 12 are associated; when a single CHA 4 comprises a plurality of host I/F ports 11 and a plurality of CHPs 12, a CHP 12 associated with a host I/F port 11 which has received an I/O request executes the processing task for the I/O request. As explained above, in this aspect, when its own load is higher than a prescribed reference value, a CHP 12 can offload an I/O task portion to another CHP 12 or to a DKP 32.

Each DKA 30 exchanges data with disks 3. The hardware configuration of a DKA 30 can be similar to that of a CHA 4. That is, a DKA 30 comprises an internal I/F 31, DKP 32, local memory for the DKP 32 (local memory 33), and a disk I/F port 36 which exchanges data with disks 3. Of an I/O task program 34 and periodic task program 35 stored in local memory 33, at least the I/O task program 34 is a computer program to be executed by a microprocessor as a DKP 32. Communication between a DKA 30 and disk 3 relies on, for example, various communication media such as FC-AL (Fibre Channel Arbitration Loop), FC switches, or SAS (Serial Attached SCSI) switches (also sometimes called SAS expanders).

The SVP 6 is a computing device, operated for maintenance or management of the storage system 2. The SVP 6 comprises memory which is local for the SVP 6 (local memory 50), and by executing a load information collection program 51 stored in this local memory 50, collects the above load information, and can transmit collected load information to the management server 40 via the management I/F port 5. The management server 40 is one kind of computer, comprising a CPU 43, interface (I/F) 44 for communication with the storage system 2, and memory 41 in which is stored the management program 42. By having the CPU 43 execute the management program 42, a load information acquisition request to seek load information is issued to the storage system 2, and when this load information acquisition request is received by the service processor 6, the collected load information can be received by the management server 40 by means of the above-described load information collection program 51.

The internal network 7 interconnects each of the CHAs 4, each of the DKAs 30, the SVP 6, cache memory 20, and shared memory 60. The internal network 7 can for example be configured as an ultra-high-speed crossbar-switch or other high-speed bus to perform data transfer by high-speed switching operations. A LAN, SAN, or other communication network can be configured as well; and, a plurality of networks can be configured together with the above-described high-speed bus.

The cache memory 20 temporarily stores data received from the host 1, data read from disks 3, and similar. Cache memory 20 comprises a memory module 22 to store data, and a memory controller 21 to control the reading and writing of data from and to the memory module 22. The memory controller 21 writes data received via the internal network 7 to the memory module 22, and reads data from the memory module 22, transmitting the data to a CHA 4 or DKA 30 via the internal network 7.

The shared memory 60 is memory which stores control information used in control of the storage system 2, and is memory shared by the CHAs 4 and DKAs 30. The shared memory 60 may be made integral with the cache memory 20. Data stored in shared memory 60 may be, for example, a staging request target table 62, write assignment table 61, offload permission bitmap 64, cache control information 63, processor operating ratio information 66, internal data bus usage ratio information 65, cache memory load information 68, I/O counter value 67, and offload failure count value 69.

Figure 4:
FIG. 4 shows an example of the configuration of a staging request target table 62.

The staging request target table 62 is a table used to determine the microprocessor which is to execute reading (staging) of data stored in a disk 3 to cache memory 20, that is, the assignee DKP for a read I/O task portion. FIG. 4 shows an example of the configuration of a staging request target table 62. In the staging request target table 62 are stored, for each host I/F port 11, a port number, LUN (Logical Unit Number), disk ID, and assignee processor ID. A single LUN is associated with the IDs of all the disks (for example, four) supplying the LUN. The LUN is for example specified by the I/O request. The disk ID is for example the ID specified on the basis of an internal address obtained by converting a leading logical block address specified by the I/O request. In this table 62, a single assignee processor ID is associated with a single port number, a single LUN, and a single disk ID. The CHP 12 takes one or more assignee processors, corresponding to the port number of the host I/F port 11 receiving the read request, and the LUN and disk ID determined from the read request, to be the assignee of the read I/O task portion.

The write assignment table 61 is a table used to determine the CHP which is the assignee for a write I/O task portion. FIG. 5 shows an example of the configuration of a write assignment table 61. In the write assignment table 61 are recorded the IDs corresponding to a plurality of areas and assignee processor IDs. Here, an "area" is an access target, specified using information comprised by the I/O request (for example, the LUN and leading logical block address, or other access target information). Specifically, the area is for example an element comprising a logical address space (an address range obtained by converting the above access target information) of a DKA 30. In this aspect, for each of a prescribed number of areas (that is, periodically), the same area ID is assigned (in the example of FIG. 6, every ten areas (that is, after area A01, at area A11), the same area ID (for example, 0) is assigned). One assignee processor ID (CHP ID) is associated with each area ID. By means of this configuration, concentration of assignees for write I/O task portions at a specified CHP 12 can be suppressed. In the write assignment table 61, an invalid value (the ID of an invalid assignee processor, for example, a value which is not a processor ID) is associated with area IDs for areas for which write I/O task portion offloading is not performed. Also, assignee processor IDs recorded in this write assignment table 61 are increased and decreased according to the loads on the CHPs 12. For example, when the load of a CHP 12 has become high, its own ID associated with one or a plurality of area IDs may be changed to an invalid value; conversely, when its own load is low, invalid values associated with one or a plurality of area IDs can be changed to its own processor ID.

The offload permission bitmap 64 is a bitmap indicating whether offloading of a read I/O task portion to each DKP 32 is permitted or not. Specifically, as for example shown in FIG. 7, one bit is associated with the ID (processor ID) of each DKP 32, and this one bit is either a value (for example "1") indicating that offloading is permitted, or a value (for example "0") indicating that offloading is not permitted.

The cache control information 63 is information used in judging whether there is a cache hit, in exclusive control, and in other cache control. The cache control information 63 comprises, for example, for each of a plurality of cache areas (for example, storage areas of memory module 22), the cache pointer of the cache area (hereafter called the cache pointer), and cache pointer attribute information. As attribute information, for example, the locked or unlocked state, cache area status, data area address, and similar are comprised. States of the cache area include, for example, "free", meaning unallocated; "dirty", meaning data stored in the cache area has not yet been used to update the disk 3; and "clean", meaning the data stored in the cache area 3 exists on the disk 3. In the event of cache hit judgment during read I/O tasks and write I/O tasks, if the cache area status is either clean or dirty, and if a data area address corresponds to the address obtained by converting access target information (for example, the LUN and leading logical block address) specified by the read request or write request), then each of the microprocessors 12, 32 takes this to be a cache hit, and otherwise judges this to be a cache miss. In the event of a cache hit, the microprocessor 12 or 32 locks the cache area (setting the value to locked), and in the event of a cache miss, allocates the cache area (for example, selects an unallocated cache area, converts the I/O request access target information into a data area address corresponding to the selected cache area, and specifies the address obtained), and locks the allocated cache area. By thus locking the cache area, other CHPs 12 and other DKPs 32 are prevented from locking the cache area. That is, so-called exclusive control of the cache area is obtained. When the cache area is unlocked, the locked/unlocked status becomes unlocked. However, other methods may be adopted for judging whether there is a cache hit or for locking the cache area.

The processor operating ratio information 66 indicates the operating ratios of each of the microprocessors 12, 32. Specifically, for example, operating ratios are recorded for each ID of the microprocessors 12 and 32.

The internal data path usage ratio information 65 records, in each of the adapters 4, 30, ratios (hereafter called internal data path usage ratios) indicating the capacity actually being used in data transfer to the transfer capacity over internal paths (for example, the paths from external I/F ports 11, 36 to internal I/F ports 16, 36) of the adapters 4, 30. The internal data path usage ratios are for example recorded for each of the adapters 4, 30.

The cache memory load information 68 is information indicating the load on the cache memory 20, and is for example a ratio (hereafter called the "cache memory load") indicating the capacity actually used for data transfer to the transfer capacity of the cache memory 20.

The I/O count value 67 is a count value of the number of I/O request tasks (or the number of requests received) of the storage system 2. For example, each time an I/O request is received, the count value 67 is incremented by one. The I/O count value 67 may be reset periodically, or may be updated without being reset.

The offload failure count value 69 is a count value of the number of I/O task portion offload failures. The offload failure count value 69 is incremented by one when for example an offload attempt is made by the assigner processor, but offloading is not possible due to circumstances at the assignee processor. When there is a deficiency in the number of assignee processors, this value tends to be increased. The offload failure count value 69 may be reset after the same period as the I/O count value 67, or may be updated without resetting.

Below, an example of the flow of processing performed in this aspect is explained.

Figure 8:
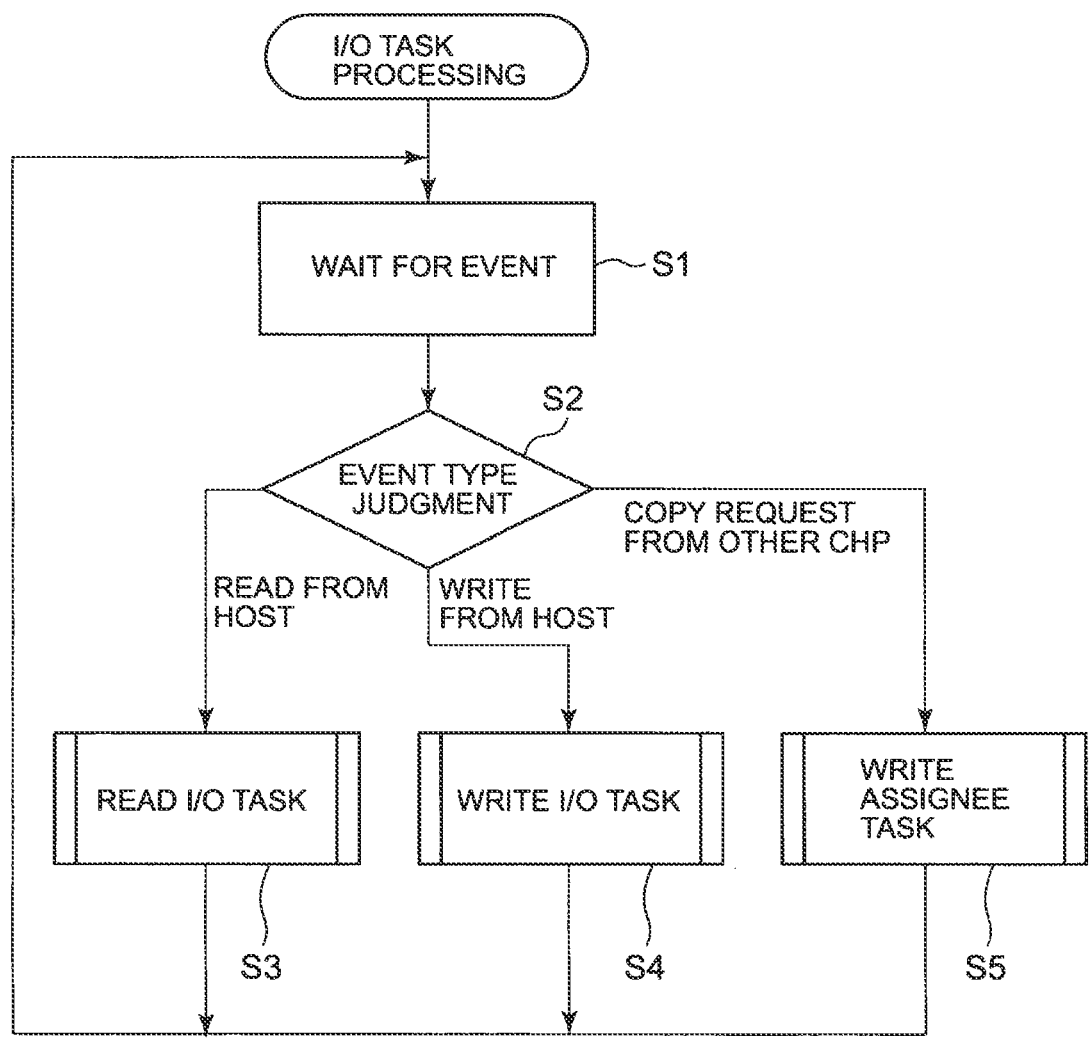
FIG. 8 shows an example of the flow of processing performed through execution of an I/O task program 14 by a CHP 12.

FIG. 8 shows an example of the flow of processing performed through execution of an I/O task program 14 by a CHP 12.

The I/O task program 14 waits for an event (step S1), and when an event occurs, judges the type of the event (S2).

If the result of S2 indicates that the event is reception of a read request from the host 1, the I/O task program 14 executes a read I/O task (S3). If the result of S2 indicates that the event is reception of a write request from the host 1, the I/O task program 14 executes a write I/O task (S4). If the result of S2 indicates that the event is a copy request from another CHP, the I/O task program 14 executes a write assignee task (S5).

Figure 9:
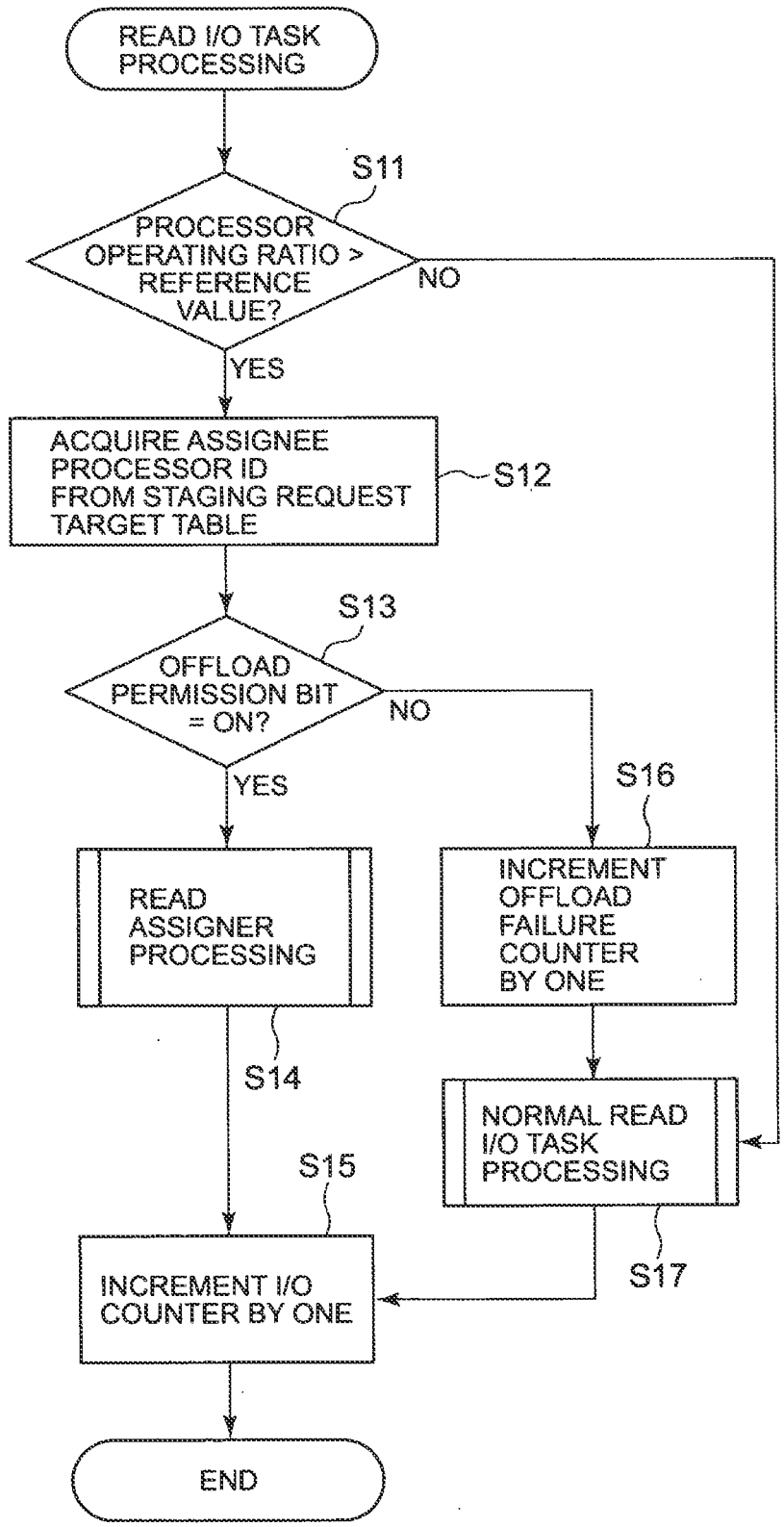
FIG. 9 shows an example of the flow of read I/O tasks in S3 of FIG. 8.

FIG. 9 shows an example of the flow of read I/O tasks in S3 of FIG. 8.

The I/O task program 14 compares the processor operating ratio of the CHP 12 executing the program itself with a prescribed reference value (S11). The processor operating ratio may be a value calculated immediately before the comparison of S11, or may be a value corresponding to the CHP 12 executing the program itself, read from the processor operating ratio information 66. If, as the result of the comparison of S11, the processor operating ratio is equal to or less than the reference value ("No" in S11), a normal read I/O task (S17) is performed; if on the other hand the processor operating ratio exceeds the reference value ("Yes" in S11), S12 is performed.

In S12, the I/O task program 14 acquires, from the staging request target table 62, the port number of the host I/F port 11 receiving the read request, and the LUN determined from the read request and one or more assignee processor IDs corresponding to the disk ID. The I/O task program 14 references the offload permission bitmap 64, and identifies the values of each bit corresponding to each of the assignee processor IDs acquired in S12 (S13).

If as the result of S13 the bit corresponding to an assignee processor ID is the value indicating that offloading is not permitted ("No" in S13), the I/O task program 14 increments the offload failure count value 69 by one (S16), and executes a normal read task (S17). If on the other hand as the result of S13 the bit corresponding to the assignee processor ID is the value indicating that offloading is permitted ("Yes" in S13), the I/O task program 14 executes a read assigner task (S14). Here, if the same result is obtained for each assignee processor ID, it is possible that offloading is executed for a certain assignee processor ID, while offload failure results for another assignee processor ID.

When S14 or S17 ends, the I/O task program 14 increments the I/O count value 67 by one (S15).

Figure 10:
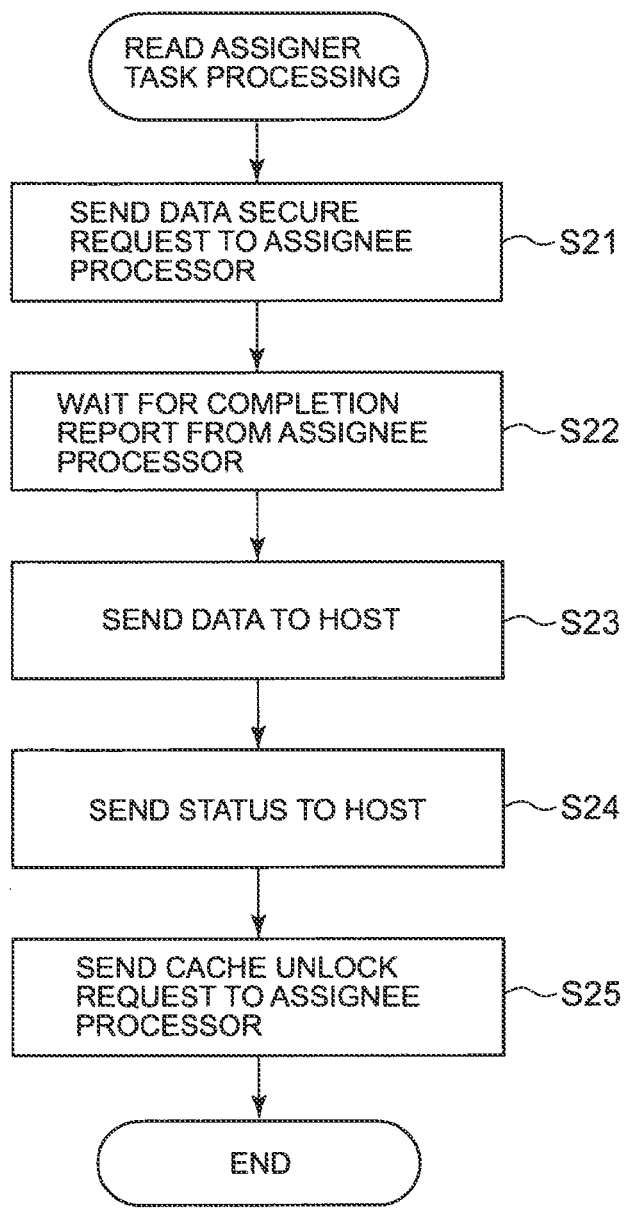
FIG. 10 shows an example of the flow of read assigner tasks in S14 in FIG. 9.
Figure 11:
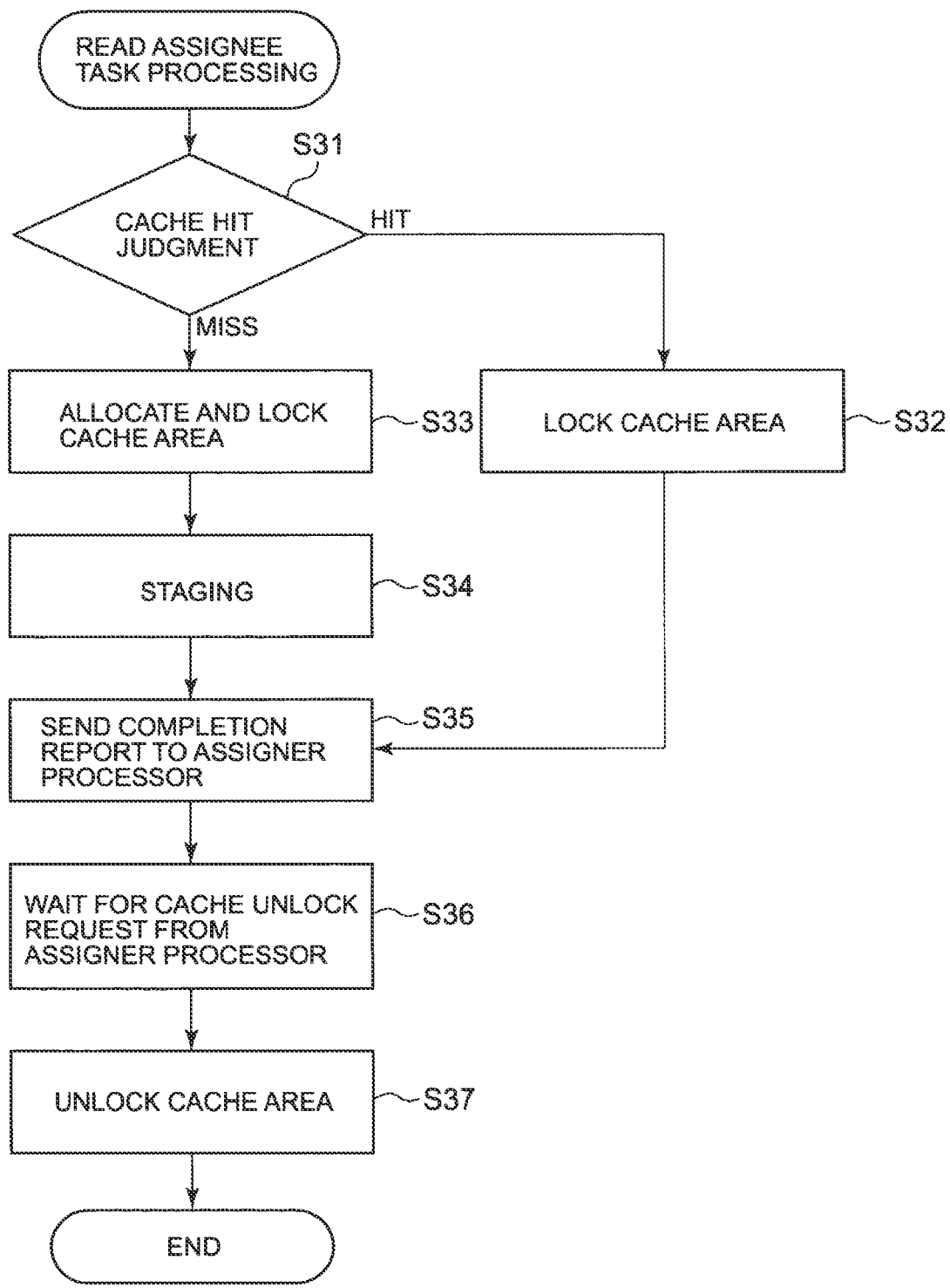
FIG. 11 shows an example of the flow of read assignee tasks performed by executing the read assigner tasks of FIG. 10.

FIG. 10 shows an example of the flow of read assigner tasks in S14 in FIG. 9. FIG. 11 shows an example of the flow of read assignee tasks performed by executing the read assigner tasks of FIG. 10.

The I/O task program 14 sends a data secure request to each of the DKPs 32 corresponding to each assignee processor ID (each assignee processor ID corresponding to an offload-permitted bit value) acquired in S12 of FIG. 9 (S21). At a DKP 32 which has received the data secure request, the I/O task program 34 executes the read assignee task of FIG. 11.

The I/O task program 34 first performs a cache hit judgment (S31).

If as the result of S31 there is a cache hit, the I/O task program 34 locks the cache area at which the cache hit occurred (S32), and staging is then completed, so that a completion report is sent to the assigner processor (the CHP 12 which is the transmission origin of the data secure request) without performing staging (S35). If on the other hand, as the result of S31, there is a cache miss, the I/O task program 34 allocates and locks a cache area (S32), performs staging (that is, reads the data of the read request from the disk 3 and stores the data in the locked cache area) (S34), and sends a completion report to the assigner processor (S35).

In the assigner processor, after S21 in FIG. 10 the I/O task program 14 waits for a completion report from the assignee processor (S22), and upon receiving a completion report, reads the data stored in the locked cache area, sends the read-out data to the host 1 (the transmission origin of the read request) (S23), and further sends the status (for example, reading ended) to the host 1 (S24). Then, the I/O task program 14 sends a cache unlock request to the assignee processor (DKP 32) (S25).

In the assignee processor, after S35 in FIG. 11 the I/O task program 34 waits for a cache unlock request from the assigner processor (S36), and upon receiving a cache unlock request, unlocks the cache area (S37). Specifically, for example, the I/O task program 34 unlocks the cache area by changing the locked status corresponding to the cache area in the cache control information 63 to unlocked status.

As explained above, if the read assigner task can be performed, the read I/O task portion is offloaded to a DKP 32; but if the read assigner task cannot be performed, then as explained referring to FIG. 9, normal read I/O processing is performed.

Figure 12:
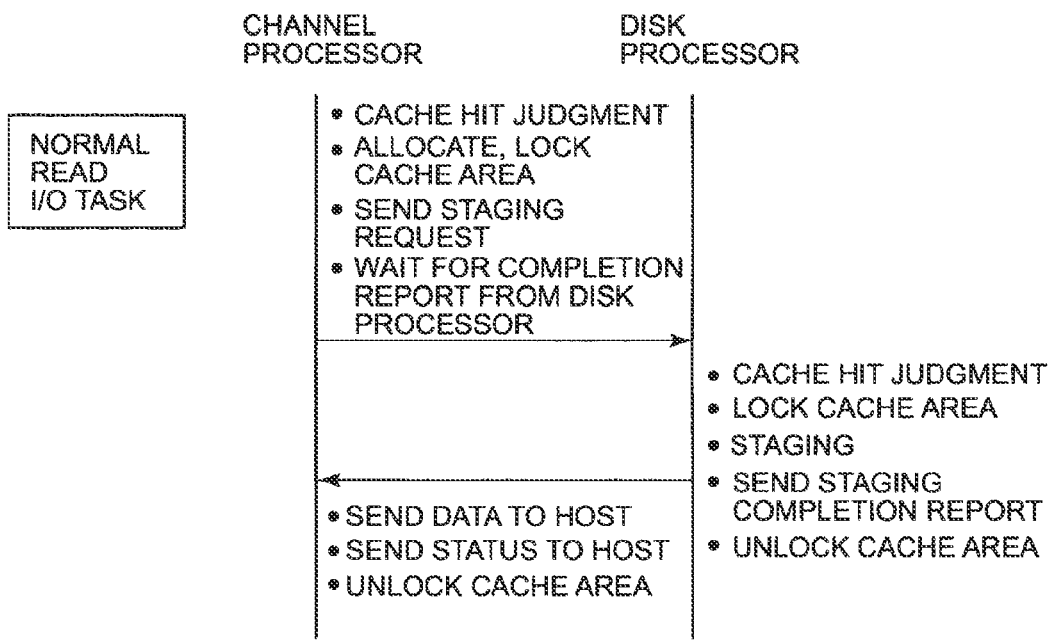
FIG. 12 summarizes an example of the flow of normal read I/O tasks.

FIG. 12 summarizes an example of the flow of normal read I/O tasks.

The I/O task program 14 executed by the CHP 12 performs cache hit judgment, and if as the result there is a cache miss, allocates and locks a cache area, transmits a staging request to the DKP 32 corresponding to the disk 3 on which the data of the read request is stored, and awaits a completion report.

The I/O task program 34 executed by the DKP 32 performs cache hit judgment in response to the staging request from the CHP 12. A cache area is already allocated, and so this judgment results in a cache hit. The I/O task program 34 locks the cache area of the cache hit (that is, the cache area is doubly locked), and staging is performed. When this ends, the I/O task program 34 returns a completion report to the CHP 12, and unlocks the locked cache area.

The I/O task program 14 executed by the CHP 12, upon receiving the completion report, reads the data from the cache area it had itself locked, transmits the read-out data to the host 1, and also transmits the status. When this ends, the I/O task program 14 unlocks the cache area which it had itself locked.

Figure 13:
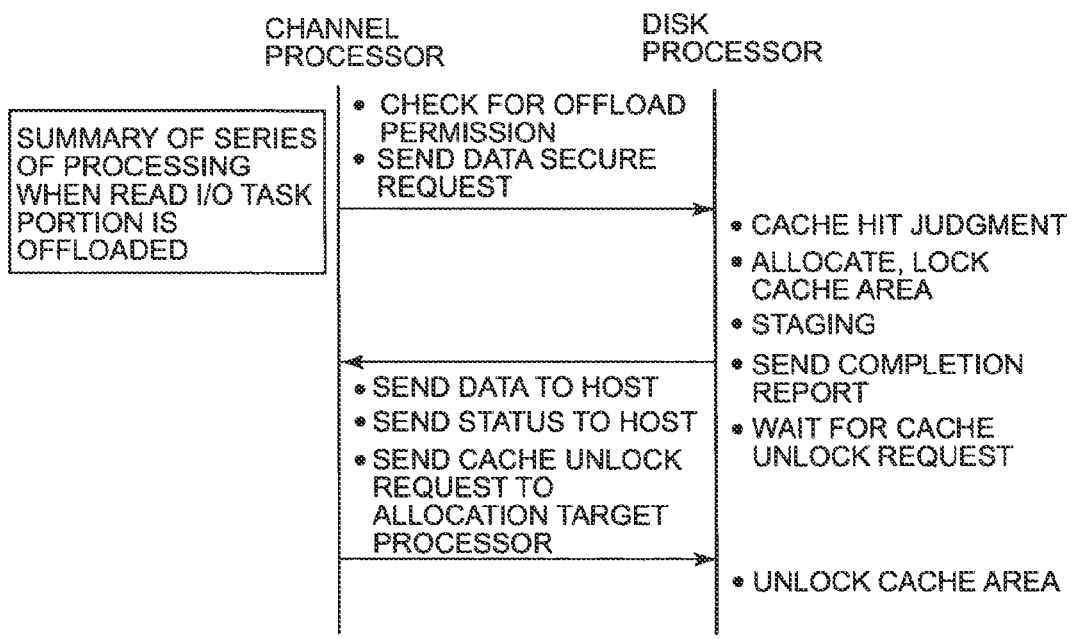
FIG. 13 shows a summary of the flow of read I/O tasks, when read assigner tasks and read assignee tasks are performed.

Upon comparing the above normal read I/O tasks with the above-described read assigner tasks and read assignee tasks (a summary of the flow of read I/O task processing when these are performed appears in FIG. 13), it is seen that, as the read I/O task portion from the assigner CHP 12, for example, cache hit judgment, cache allocation and locking, and cache area unlocking (hereafter inclusively called "cache control processing") is offloaded (the increase in final communication is due to the fact that the assignee DKP 32 is made to maintain the lock until the completion of I/O task processing). In normal read I/O tasks, the load is higher for cache control processing than for other task processing. In order to execute offloading of this high-load cache control processing, the read I/O task processing of FIG. 9, differing from normal read I/O tasks and comprising processor operating ratio checks and offload permission checks, is performed; and when the load (processor operating ratio) of the CHP 12 receiving the read request is equal to or below a reference value, or when offloading is not permitted, normal read I/O task processing is performed.

As explained above, when the load on a CHP 12 which has received a read request is high, a read I/O task portion can be offloaded from the CHP 12 to a DKP 32. By this means, the load on the assigner CHP 12 can be reduced, and a bottleneck at the assigner processor CHP 12 can be avoided, leading to improved single-port limit performance. Even when a read I/O task portion is offloaded from the CHP 12 to a DKP 32, the load on the DKP 32 is not increased by the amount of the decrease in the load on the CHP 12, and it is thought that the load on the DKP 32 does not change greatly. This is because the DKP 32 performs cache control task processing regardless of whether there is offloading (that is, even during normal read I/O task processing).

Figure 14:
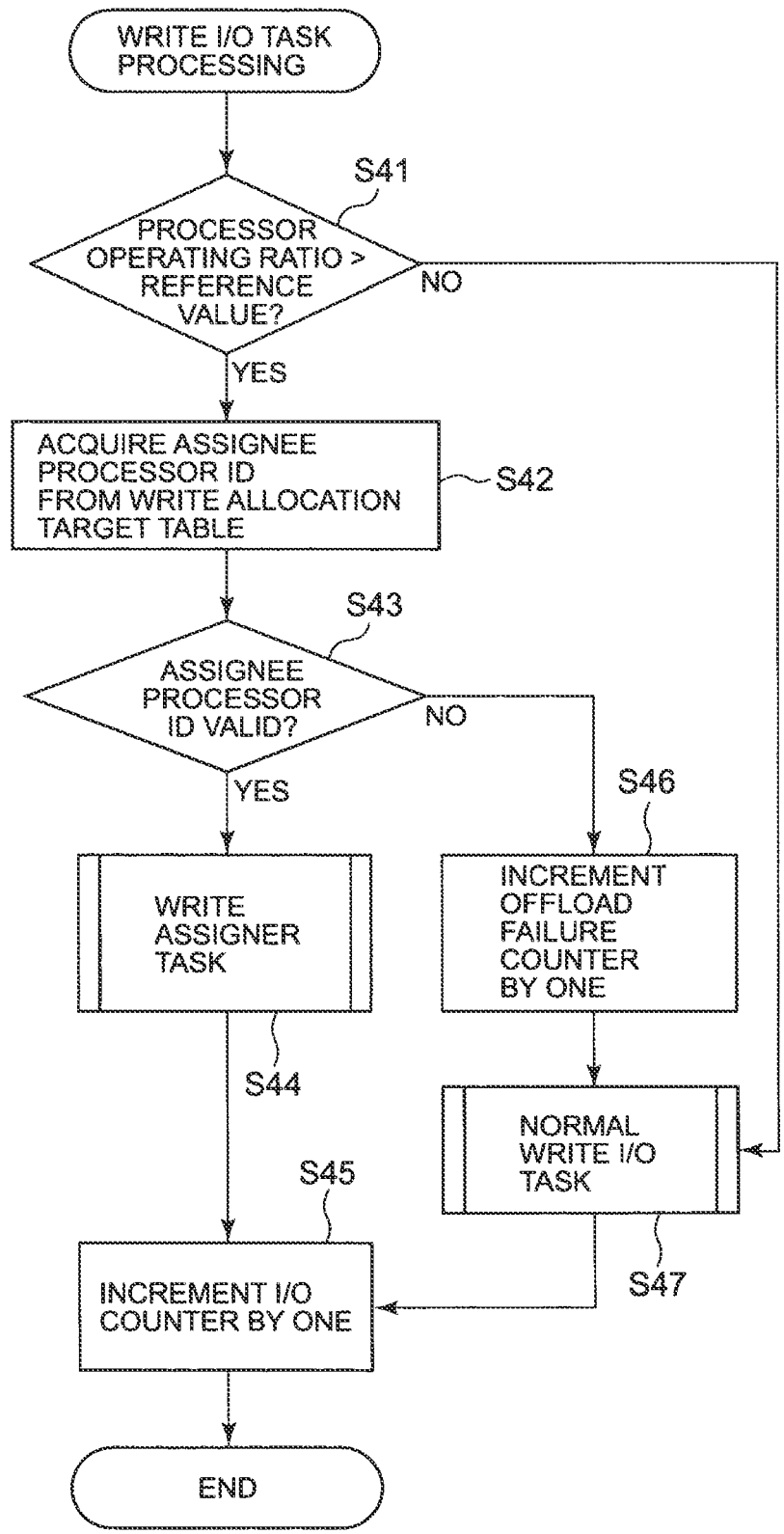
FIG. 14 shows an example of the flow of write I/O tasks in S4 of FIG. 8.

FIG. 14 shows an example of the flow of write I/O tasks in S4 of FIG. 8.

The I/O task program 14 compares the processor operating ratio of the CHP 12 executing the program itself with a prescribed reference value (S41). If as the result of the comparison of S41 the processor operating ratio is equal to or lower than the reference value ("No" in S41), the I/O task program 14 performs normal write I/O task processing (S47);

if on the other hand the processor operating ratio exceeds the reference value ("Yes" in S41), S42 is performed.

In S42, the I/O task program 14 acquires, from the write assignment table 61, the assignee processor ID corresponding to the ID of an area determined from the write request. If the acquired assignee processor ID is an invalid value ("No" in S43), the I/O task program 14 increments the offload failure count value 69 by one (S46) and executes normal write task processing (S17). If on the other hand the acquired assignee processor ID is not an invalid value ("Yes" in S43), the I/O task program 14 executes write assigner task processing (S44).

When S44 or S47 ends, the I/O ask program 14 increments the I/O count value 67 by one (S45).

Figure 15:
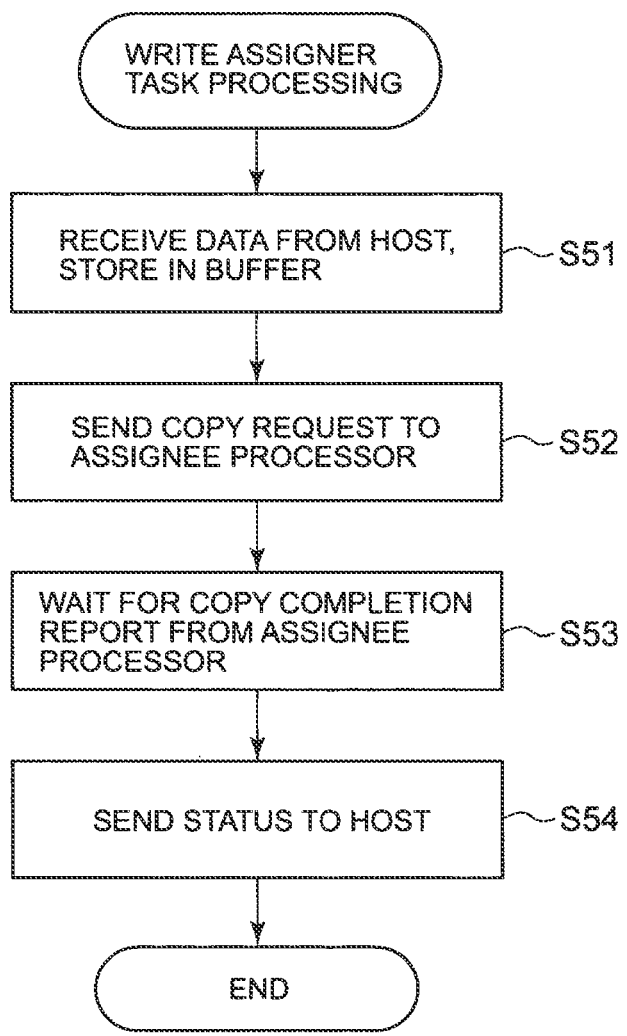
FIG. 15 shows an example of the flow of write assigner tasks in S44 of FIG. 14.
Figure 16:
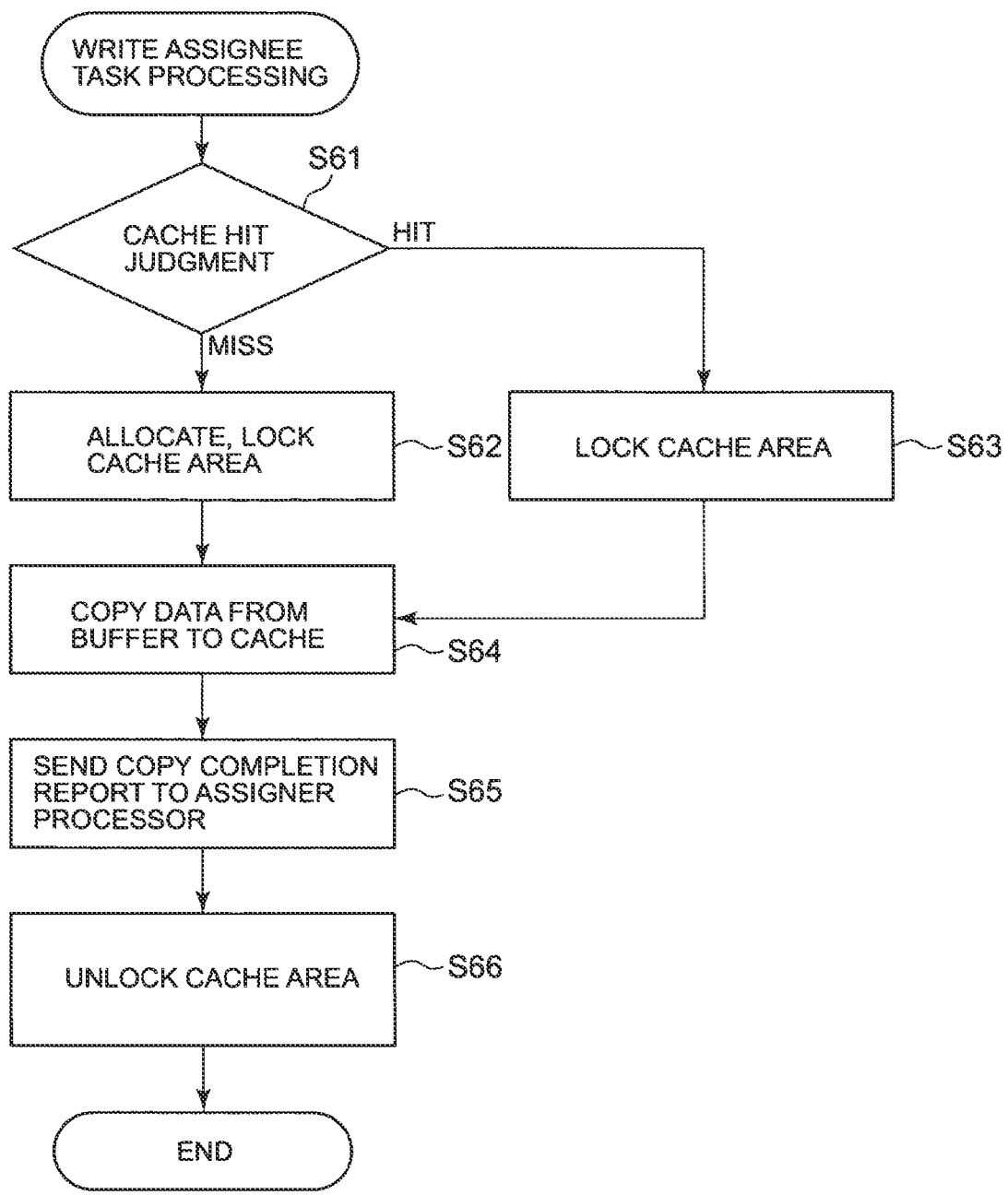
FIG. 16 shows an example of the flow of write assignee tasks, performed by executing write assignment tasks in FIG. 15.

FIG. 15 shows an example of the flow of write assigner tasks in S44 of FIG. 14. FIG. 16 shows an example of the flow of write assignee tasks (S5 in FIG. 8), performed by executing write assigner task processing in FIG. 15.

The I/O task program 14 receives data (data according to the write request) from the host 1, and stores the received data in a buffer (S51). The buffer may exist anywhere if it is a storage area within the storage system 2; in this aspect, the buffer is provided in cache memory 20.

The I/O task program 14 sends a copy request to another CHP 12 corresponding to the assignee processor ID acquired in S42 of FIG. 14 (S21). As a result, the event of copy request reception in FIG. 8 occurs at the other CHP 12. This copy request comprises, for example, a pointer to the data stored in the buffer.

The I/O task program 14 executed by the other CHP 12 (hereafter called the "other I/O task program 14"), in response to the copy request, first performs cache hit judgment (S61 in FIG. 16).

If as the result of S61 there is a cache hit, the other I/O task program 14 locks the cache area of the cache hit (S63), and performs S64. If on the other hand, as the result of S61, there is a cache miss, the other I/O task program 14 allocates and locks a cache area (S62), and copies data specified by the received copy request from the buffer to the locked cache area (S64). The other I/O task program 14 then sends a completion report to the assigner processor, and unlocks the locked cache area (S66).

At the assigner processor, after S52 in FIG. 15, the I/O task program 14 awaits a completion report from the assignee processor (S53), and on receiving the completion report, sends the status (for example, write-ended status) to the host 1 which is the write request transmission origin (S54).

As explained above, if write assigner task processing can be performed, a write I/O task portion is offloaded to another CHP 12, but if write assigner task processing cannot be performed, then as explained referring to FIG. 14, normal write I/O task processing is performed.

Figure 17:
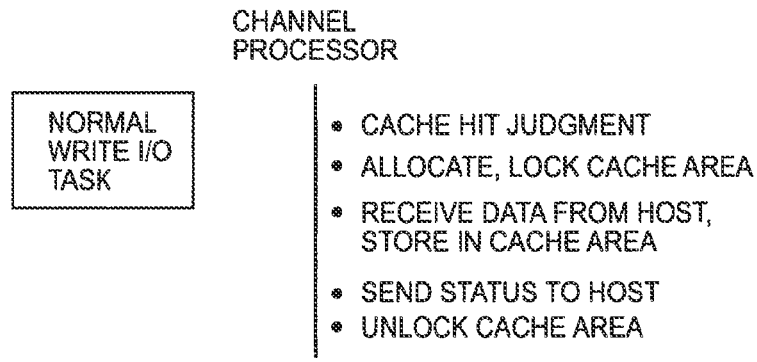
FIG. 17 summarizes an example of the flow of normal write I/O tasks.

FIG. 17 summarizes an example of the flow of normal write I/O tasks.

The I/O task program 14 performs cache hit judgment, and if as the result there is a cache miss, allocates and locks a cache area, receives data from the host 1, stores the received data in the cache area, returns the status to the host 1, and unlocks the cache area.

Figure 18:
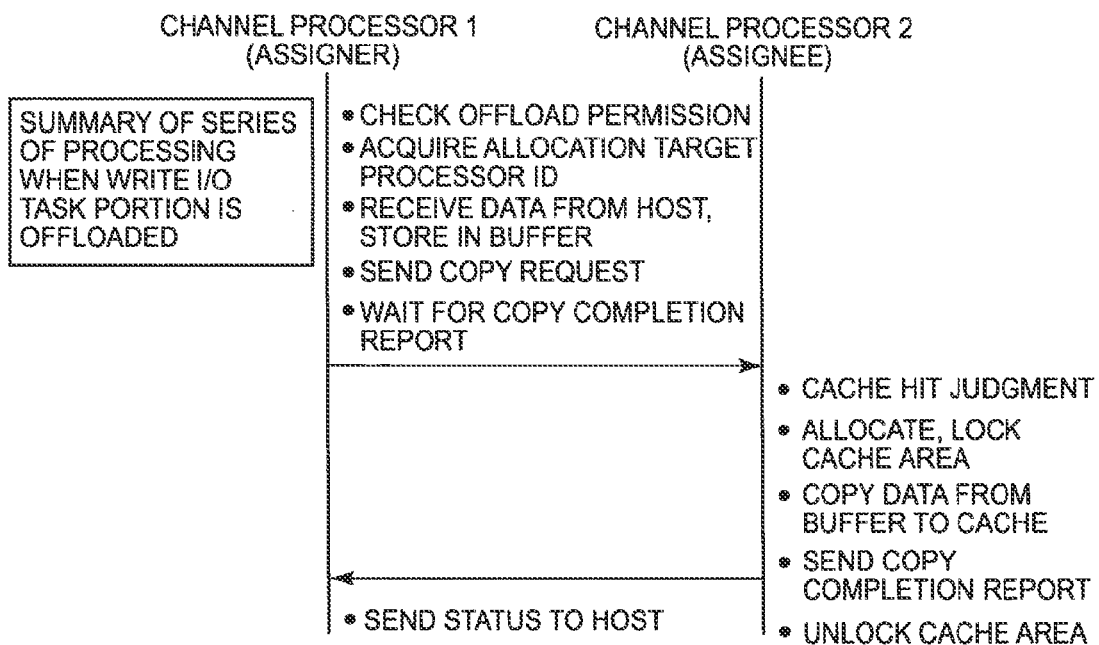
FIG. 18 summarizes the flow of write I/O tasks when write assigner tasks and write assignee tasks are performed.

Upon comparing the above normal write I/O task processing and the above-described write assigner task processing and write assignee task processing (FIG. 18 shows a summary of the flow of write I/O task processing when performed by these), it is seen that as the write I/O task portion from the assigner CHP 12, for example, the above-described cache control tasks (specifically, cache hit judgment, cache allocation and locking task, and cache area unlocking task processing), are offloaded. In normal write I/O tasks, cache control task processing incurs a high load compared with other processing. In order to execute offloading of this high-load cache control task processing, write I/O task processing in FIG. 14 differing from normal write I/O task processing is performed, comprising processor operating ratio checks and judgment of whether the assignee processor ID is valid; and when the load (processor operating ratio) on the CHP 12 receiving the write request is equal to or less than a reference value, or when the assignee processor ID is an invalid value, normal write I/O task processing is performed.

In this way, when the load on a CHP 12 receiving a write request is high, a write I/O task portion is offloaded by the CHP 12 to another CHP 12. By this means, the load on the assigner CHP 12 is reduced, and a bottleneck at the assigner processor CHP 12 can be avoided, leading to improved single-port limit performance. In this aspect, the CHP 12 stores data in a buffer, and another CHP 12 which is the assignee secures a cache area and copies the data from the buffer to this cache area. That is, data is written twice to cache memory 20. Hence, although this seems to entail more trouble, the task processing to properly secure a cache area incurs a high load, and the method described above results in a lower load for the CHP 12.

According to this aspect, write I/O tasks can be divided into tasks to store data from the host 1 in a cache area, and tasks to write the data from the cache area to a disk 3. A DKP 32 must perform the latter tasks, and if a configuration of a parity group of a plurality of disks 3 is adopted, then a plurality of DKPs 32 operate in order to write data. On the other hand, the load on the CHP 12 is low if an I/O request is not received from the host. In light of these facts, in this aspect a write I/O task portion is offloaded to another CHP 12, rather than to a DKP 32.

According to this invention, when a read I/O task portion is offloaded to another CHP 12, in the case of a cache miss, inefficiency occurs in that a staging request is transmitted from the other CHP 12 to a DKP 32. In light of this fact, in this aspect, a read I/O task portion is offloaded to a DKP 32 rather than to another CHP 12.

Next, periodic tasks of CHPs 12 are explained. In periodic tasks, processing is performed to increase or decrease the area assigned to a CHP 12, according to the operating ratio of the CHP 12, the data path usage ratio of a CHA 4 comprised by the CHP 12, and the cache memory load.

Figure 19:
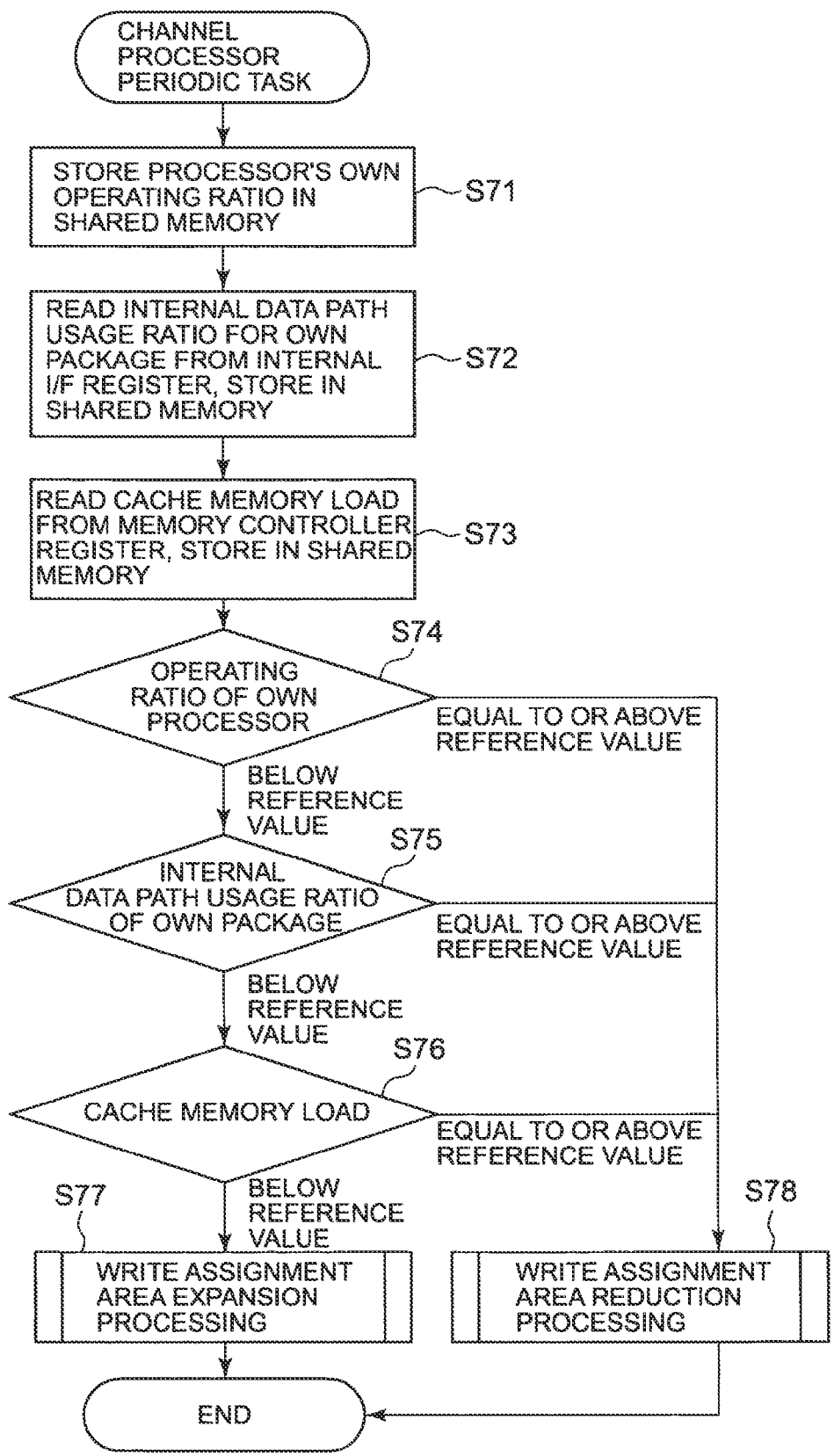
FIG. 19 shows an example of the flow of periodic tasks by a CHP 12.

FIG. 19 shows an example of the flow of periodic tasks by a CHP 12. These periodic tasks are performed by execution by the CHP 12 of a periodic task program 15.

The CHP 12 writes its own operating ratio, in association with its own processor ID, to the processor operating ratio information in shared memory 60 (S71).

The CHP 12 then reads the internal data path usage ratio for the CHAs 4 comprised by the CHP 12 from a register of the internal I/F 16, and writes this, in association with the IDs of the CHAs 4, to the internal data path usage ratio information 65 in shared memory 60 (S72). The internal data path usage ratio is written periodically to an internal I/F register (not shown) by a prescribed component element (for example, an LSI of the internal I/F) of a CHA 4. The location for writing of the internal data path usage ratio is not limited to such a register, but may be elsewhere in the CHA 4.

Next, the CHP 12 reads cache memory load information from a register in the memory controller 21 of the cache memory 20, and writes this to shared memory 60 (S73). The cache memory load information is written to the register (not shown) by the memory controller 21. The location for writing of the cache memory load information is not limited to such a register, but may be elsewhere.

The CHP 12 judges whether the processor operating ratio written in S71 is equal to or greater than, or less than, an operating ratio reference value (S74). If the processor operating ratio is less than the operating ratio reference value, the CHP 12 judges whether the internal data path usage ratio written in S72 is equal to or greater than, or less than, a usage ratio reference value (S75). If the internal data path usage ratio is less than the usage ratio reference value, the CHP 12 judges whether the cache memory load information written in S73 is equal to or greater than, or less than, a load reference value (S76). If the cache memory load is less than the load reference value, the CHP 12 executes write assignment area expansion task processing (S77); whereas if the respective values in any one or more among S74, S75 and S76 are judged to be equal to or greater than the respective reference values, write assignment area reduction task processing (S78) is executed.

By means of the above processing, when it is preferable that a write I/O task portion be assigned to itself, the CHP 12 performs write assignment area enlargement processing to increase the probability that the CHP 12 itself will be determined as the assignee; conversely, when it is preferable that the a write I/O task portion not be assigned to itself, the CHP 12 performs write assignment area reduction processing to decrease the probability that the CHP 12 itself will be determined as the assignee. Write assignment area reduction processing is performed when the processor operating ratio is equal to or greater than the operating ratio reference value, in order to prevent a situation in which, upon receiving an assignment, the processor operating ratio rises still higher. Write assignment area reduction processing is performed when the internal data path usage ratio is equal to or greater than the usage ratio reference value, in order to prevent a situation in which, upon receiving an assignment, the internal data path usage ratio rises still higher. Write assignment area reduction processing is performed when the cache memory load is equal to or greater than the load reference value, in order to prevent a situation in which, upon receiving an assignment, the number of communications with the cache memory 20 increases.

Figure 20:
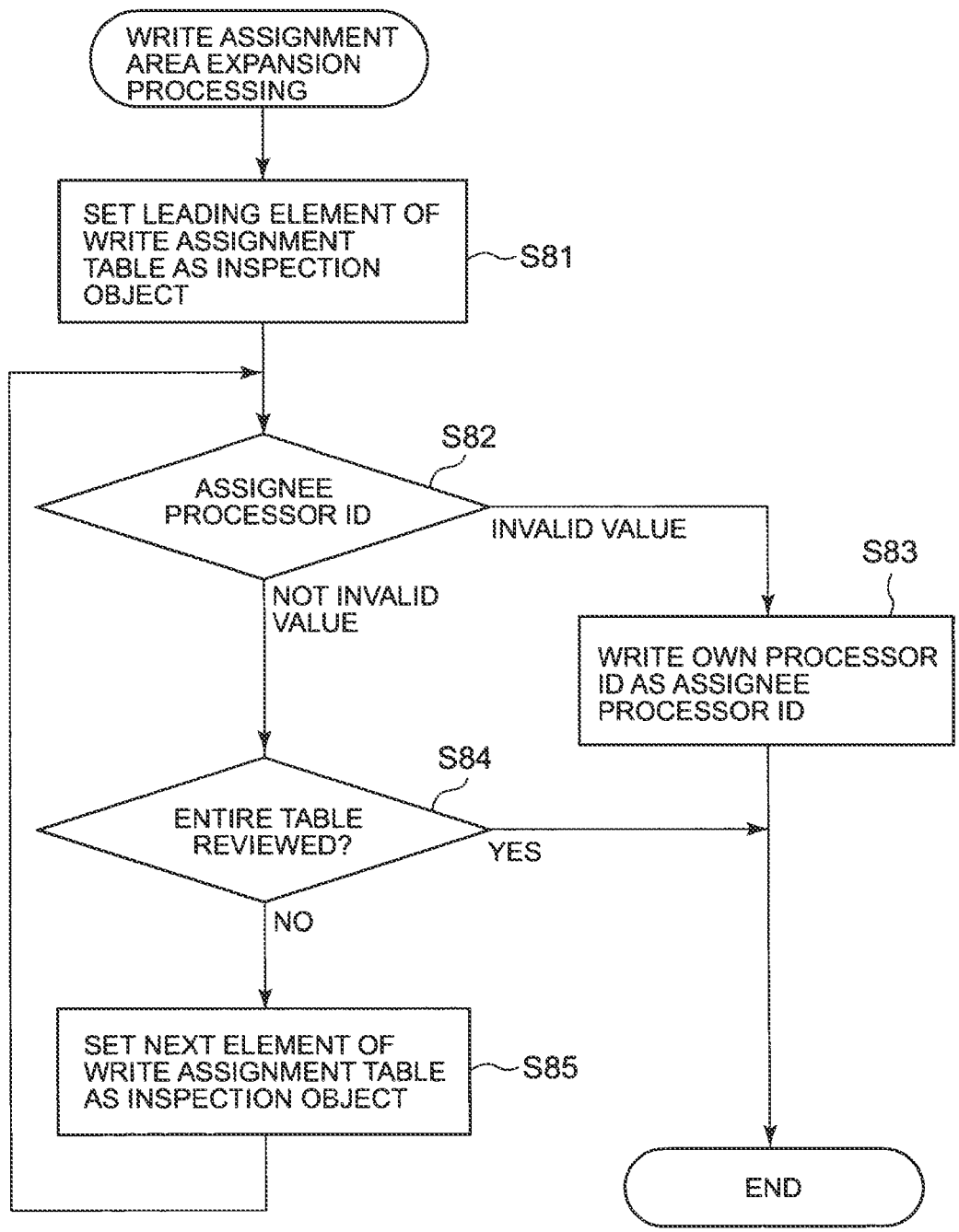
FIG. 20 shows an example of the flow of write assignment area enlargement task processing.

FIG. 20 shows an example of the flow of write assignment area enlargement tasks.

The CHP 12 takes the leading element (leading row) of the write assignment table 61 as an object for inspection (S81), and judges whether the assignee processor ID of the object for inspection is an invalid value (S82).

If as the result of S82 the value is invalid, the CHP 12 changes the invalid value to its own processor ID (S83), and ends processing.

If on the other hand, as the result of S82 the value is not invalid, then the CHP 12 takes the next element (row) as the object for inspection ("No" in S84, S85), and again performs the judgment of S82. The CHP 12 repeats this processing until an invalid value is found in S82; if no invalid value is found even after reviewing the entire table 61 ("Yes" in S84), processing is ended.

Figure 21:
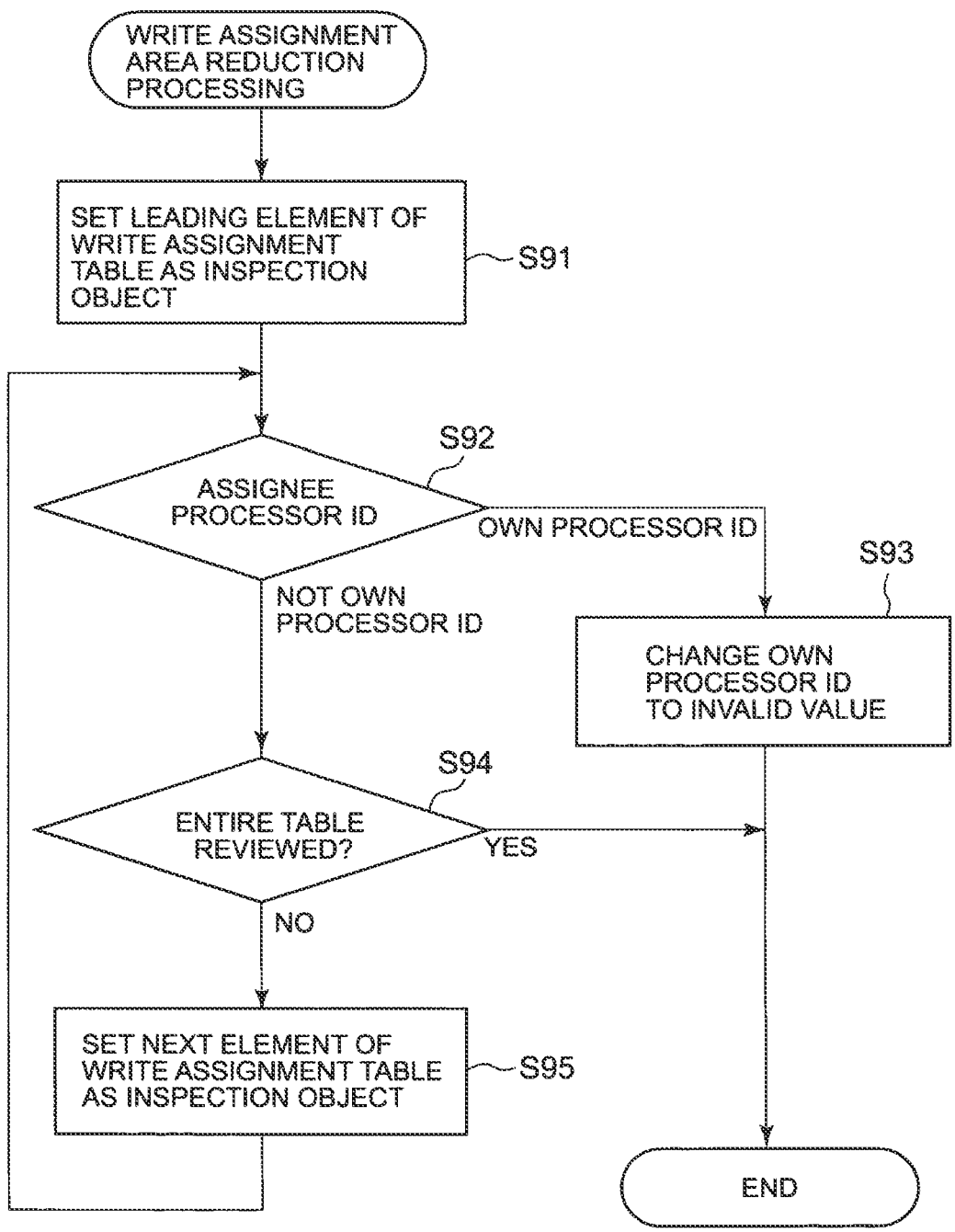
FIG. 21 shows an example of the flow of write assignment area reduction task processing.

FIG. 21 shows an example of the flow of write assignment area reduction task processing.

The CHP 12 takes as an object for inspection the leading element (leading row) of the write assignment table 61 (S91), and judges whether the assignee processor ID of the object for inspection is its own processor ID (S92).

If as the result of S92 the ID is its own processor ID, the CHP 12 changes its own processor ID to an invalid value (S93), and ends processing.

If on the other hand, as the result of S92, the ID is not its own processor ID, the CHP 12 takes as the object for inspection the next element (next row) ("No" in S94, S95), and again performs the judgment of S92. The CHP 12 repeats this processing until its own processor ID is found in S92, and if its own processor ID is not found even upon reviewing the entire table 61 ("Yes" in S94), ends processing.

Next, periodic tasks of a DKP 32 are explained. In periodic tasks, processing is performed to turn on and off the offload permission bitmap bits according to the processor operating ratio of the DKP 32.

Figure 22:
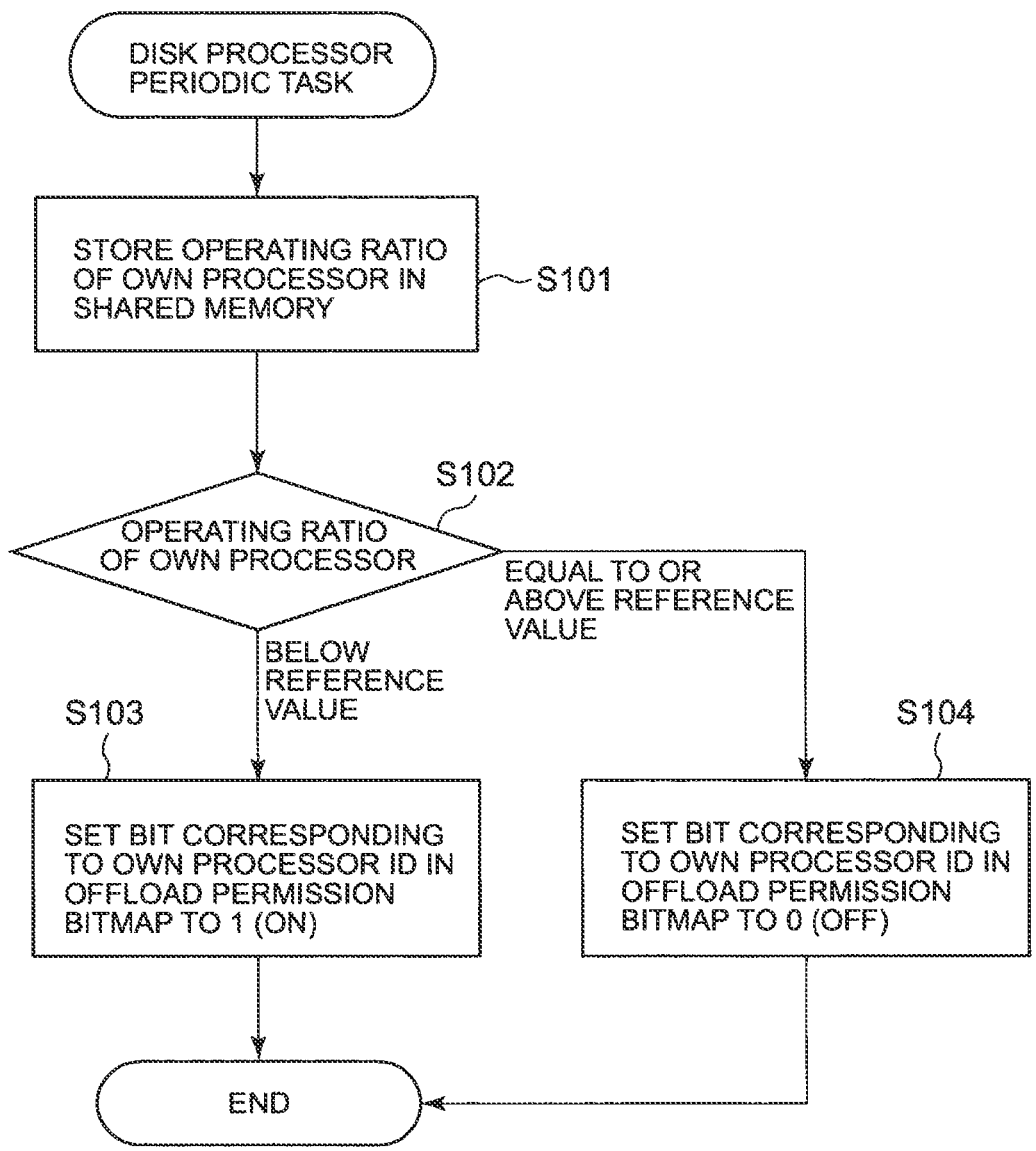
FIG. 22 shows an example of the flow of periodic tasks of a DKP 32.

FIG. 22 shows an example of the flow of periodic tasks of a DKP 32. These periodic tasks are performed by having the DKP 32 execute a periodic task program 35.

The DKP 32 writes its own operating ratio, associated with its own processor ID, to the processor operating ratio information in shared memory 60 (S101).

The DKP 32 judges whether the processor operating ratio written in S101 is equal to or greater than, or less than, an operating ratio reference value (S74). The operating ratio reference value may be the same value as, or different from, a reference value used to judge whether or not to perform offloading, or a reference value used in periodic tasks by the CHP 13.

If in S74 the value is less than the operating ratio reference value, the DKP 32 sets to 1 (turns on) the bit in the offload permission bitmap corresponding to its own processor ID; if on the other hand the value in S74 is equal to or greater than the operating ratio reference value, the DKP 32 sets to 0 (turns off) the bit in the offload permission bitmap corresponding to its own processor ID.

By means of the above processing, the DKP 32 can adjust the probability with which it will be selected as an assignee, according to its own load.

Next, task processing to support hardware expansion is explained. In this processing, for example, by having the CPU 43 of the management server 40 execute the management program 42, load check task processing is performed either periodically or irregularly.

Figure 23:
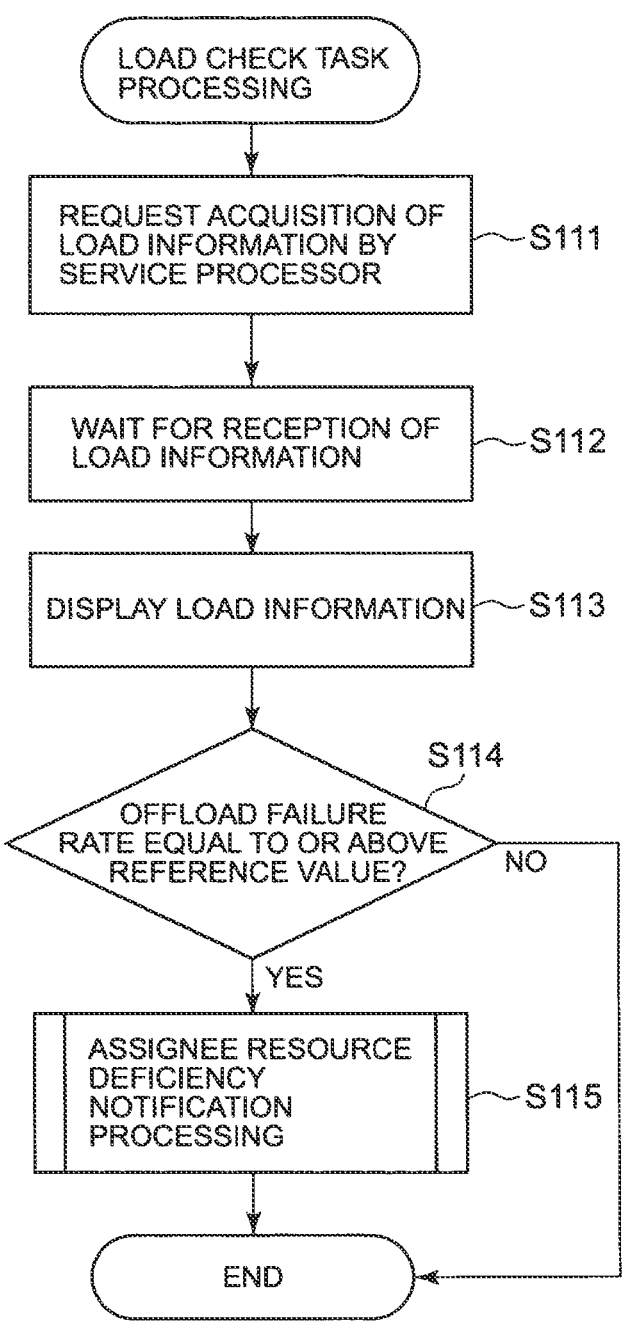
FIG. 23 shows an example of the flow of load check tasks.

FIG. 23 shows an example of the flow of load check tasks.

Figure 24:
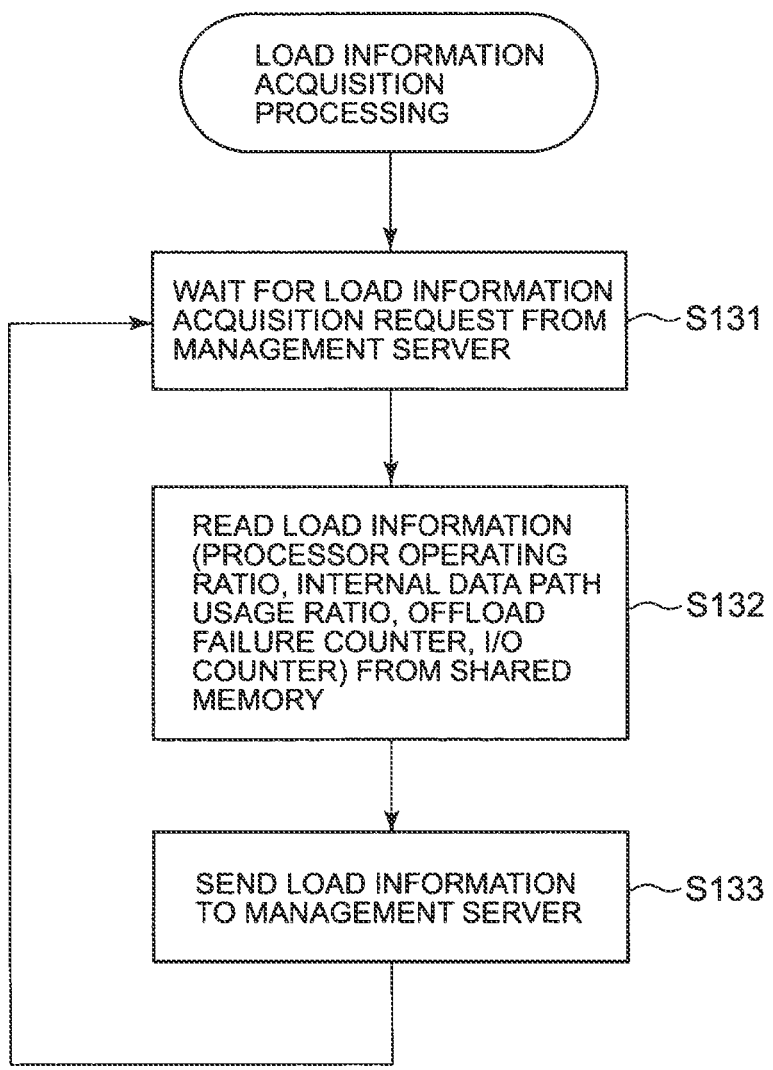
FIG. 24 shows an example of the flow of load information acquisition tasks; and, FIG. 25 shows an example of the flow of assignee resource deficiency notification tasks.

The management server 40 sends a load information acquisition request to the SVP 6 (S111), and waits to receive load information (S112). As indicated in FIG. 24, the SVP 6 waits for a load information acquisition request (S131), and upon receiving a load information acquisition request, load information (processor operating ratio information 66, internal data path usage ratio information 65, offload failure count value 69, and I/O count value 67) is read from shared memory 60 (S132), and the read-out load information is sent to the management server 40 (S133).

Upon receiving load information, the management server 40 displays the received management information (S113). The management server 40 also uses the load information to calculate the offload failure rate, and judges whether the offload failure rate is equal to or greater than a failure rate reference value (S114). The offload failure rate is for example calculated by dividing the offload failure count value by the I/O count value.

If as the result of S114 the offload failure rate is equal to or greater than the failure rate reference value, the management server 40 executes assignee resource deficiency notification task processing (S115).

Figure 25:
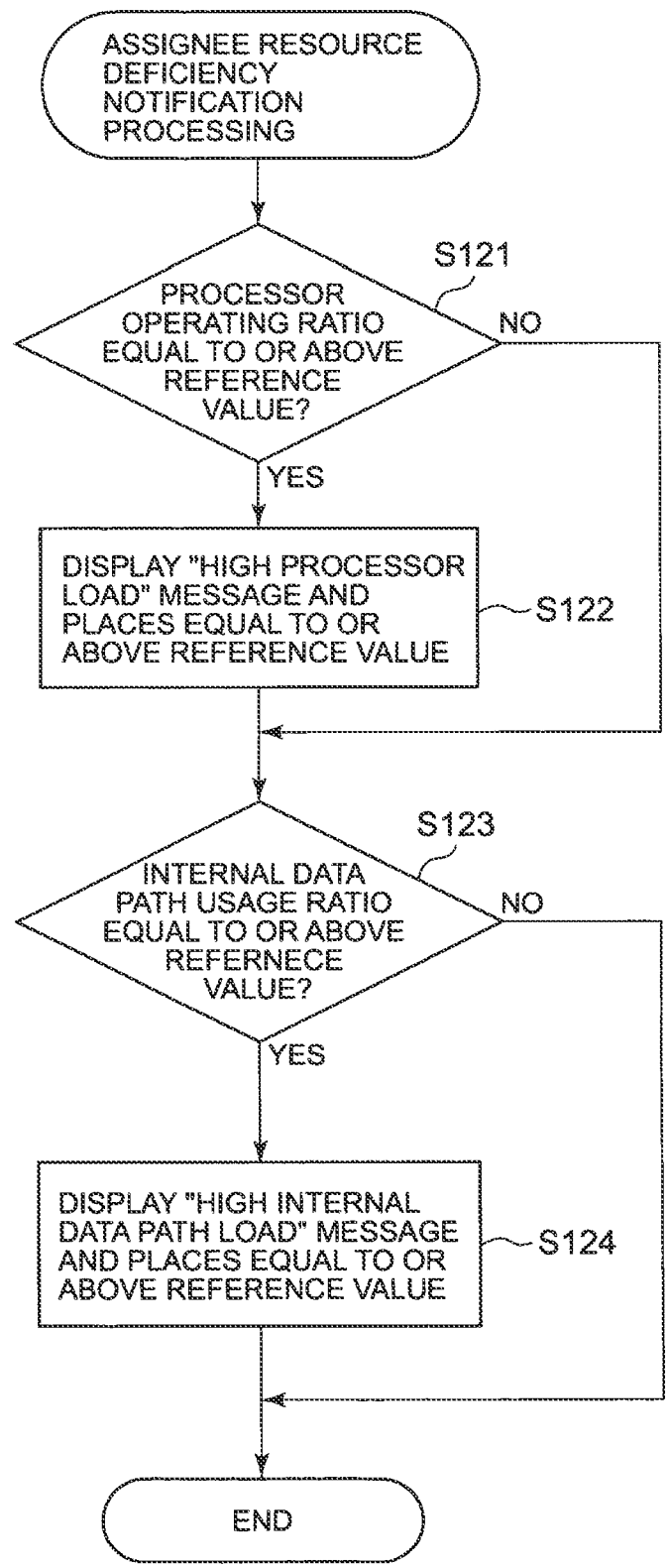

FIG. 25 shows an example of the flow of the assignee resource deficiency notification processing.

The management server 40 performs comparisons to determine whether each of the processor operating ratios in the load information is equal to or greater than the operating ratio reference value (S121), and if a processor operating ratio is equal to or greater than the operating ratio reference value, displays a "high processor load" message, and the place at which the operating ratio is equal to or greater than the operating ratio reference value (for example, the ID of a CHA 4 or DKA 30, and the processor ID) (S122). In response to this display, if a manager, for example, concludes that the high-load processor is a CHP 12, and that the number of CHPs 12 is large, then it can be expected that by expanding the number of CHAs 4 the offload failure rate will be lowered; and if it is concluded that the high-load processor is a DKP 32, and that there are a large number of DKPs 32, then it can be expected that by expanding the number of DKAs 30, the offload failure rate will be lowered.

The management server 40 performs comparisons to determine whether each of the internal data path usage ratios in the load information is equal to or greater than the usage ratio reference value (S123), and if there is a package for which the ratio is equal to or greater than the usage ratio reference value (a CHA 4 or DKA 30), then a "high internal data path load" message, and the place at which the usage ratio exceeds the usage ratio reference value (for example the ID of a CHA 4 or DKA 30), are displayed (S124). In response to this display, if a manager, for example, concludes that the high-load package is a CHA 4, and that the number of CHAs 4 is large, then it can be expected that by expanding the number of CHAs 4 the offload failure rate will be lowered; and if it is concluded that the high-load package is a DKA 30, and that there are a large number of DKAs 30, then it can be expected that by expanding the number of DKAs 30, the offload failure rate will be lowered.

By means of the above load check processing and assignee resource deficiency notification processing, support can be provided for planning of hardware expansion by managers to resolve assignee bottlenecks.

In the above, preferred aspects of the invention have been explained; but these are illustrative examples used to explain the invention, and the scope of the invention is not limited to these aspects. This invention can be implemented with various modifications. For example, offload failure count values can be prepared separately for reading and writing, offload failure rates can be computed separately for reading and writing, and based on these results, package expansion can be suggested (for example, when the read offload failure rate is equal to or above the reference value, and so assignee resource deficiency notification processing is performed, the object for expansion may be DKAs). Further, in place of a management server 40, the SVP 6 or the host 1 may perform load check processing and assignee resource deficiency notification processing. Further, at least a portion of the various information stored in shared memory 60 may be stored in the various local memory 13, 33, and instead of referencing shared memory 60, the local memory 13 or 33 may be referenced. Further, if the cache memory load is equal to or above a reference value, cache memory expansion may be suggested. Further, instead of disk 3, a storage device may be other type storage device (e.g. flash memory).

What is claimed is:

1. A storage system, comprising:
   a controller; and
   a plurality of storage devices associated with a logical unit;
   wherein the controller comprises:
   a plurality of host interfaces, one of said host interfaces being connected to a host computer;
   a plurality of disk interfaces, each connected to a respective one of the plurality of storage devices;
   a plurality of first processors, each associated with a respective one of the plurality of host interfaces and having an operating rate;
   a plurality of second processors, each connected to a respective one of the plurality of disk interfaces and having an operating rate; and
   a cache memory,
   wherein, upon receipt of a write request from the host computer at the one of the host interfaces, one of the first processors associated with the host interface is configured to perform either one of first or second write operations in accordance with the operating rate of the first processor,
   the first write operations comprising checking whether there is a cache hit or a cache miss, and if cache hit has occurred, writing data along with the write request to an allocated area in the cache memory, and if a cache miss has occurred, allocating an area in the cache memory and writing data into the allocated area, and sending a write completion notification to the host computer,
   the second write operations comprising requesting another one of the first processors to check whether there is a cache hit or a cache miss, and if cache hit has occurred, writing data along with the write request to an allocated area in the cache memory, and if cache miss has occurred, allocating an area in the cache memory and writing the data in the allocated area by the another one of the first processors, and if the another one of the first processors has completed the requested operations, sending a write completion notification to the host computer,
   wherein, if the operating rate of the first processor is less than or equal to a threshold, the one of the first processors associated the host interface is configured to perform the first write operations, and otherwise to perform the second write operations.

2. The storage system according to claim 1,
   wherein in receipt of a read request from the host computer at the host interface, the one of the first processors associated with the host interface is configured to perform either one of the first read operations or the second read operations in accordance with the operating rate of the first processor,
   the first read operations comprising checking whether there is a cache hit or a cache miss, and if cache hit has occurred, reading data from the cache memory and sending the data to the host computer, and if a cache miss has occurred, allocating an area in the cache memory, reading data from the storage devices, writing the data in the allocated area by the one of the first processors in the first read operations and sending the data to the host computer, and
   the second read operations comprising requesting one of the second processors to check whether there is a cache hit or a cache miss, and if cache miss has occurred, allocating an area in the cache memory, reading data specified by the read request from the storage devices, writing the data specified by the read request in the allocated area by the second processor, and if the second processor has completed the requested operations, reading the data specified by the read request from the cache memory and sending the data specified by the read request to the host computer.

3. The storage system according to claim 2, wherein if the operating rate of the first processor is less than or equal to a threshold, the one of the first processors associated with the host interface is configured to perform the first read operations, and otherwise to perform the second read operations.

4. A storage system, comprising:
a controller; and
a plurality of storage devices associated with a logical unit;
wherein the controller comprises:
a plurality of host interfaces, one of said host interfaces being connected to a host computer;
a plurality of disk interfaces, each connected to a respective one of the plurality of storage devices;
a plurality of first processors, each associated with a respective one of the plurality of host interfaces and having an operating rate;
a plurality of second processors, each connected to a respective one of the plurality of disk interfaces and having an operating rate; and
a cache memory,
wherein, upon receipt of a write request from the host computer at the one of the host interfaces, one of the first processors, which is different from the first processor associated with the host interface, is configured to perform, instead of the first processor associated with the host interface, checking as to whether there is a cache hit or a cache miss, and if cache hit has occurred, writing data along with the write request to an allocated area in the cache memory, and, if cache miss has occurred, allocating an area in the cache memory and writing the data into the allocated area, and
wherein, if the operating rate of the one of the first processors which is different is less than or equal to a threshold, performing the first read operations by the one of the first processors associated the host interface, and otherwise performing the second read operations.

5. The storage system according to claim 4,
wherein upon receipt of a read request from the host computer at the host interface, one of the second processors is configured to perform, instead of the first processor associated with the host interface, checking whether there is a cache hit or a cache miss, and if cache miss has occurred, allocating an area in the cache memory, reading data specified by the read request from the storage devices, and writing the data specified by the read request in the area allocated by the second processor.

6. A method of exchanging data with a cache memory in a storage system, which is coupled to a host computer operative to generate write requests, that comprises a controller and a plurality of storage devices associated with a logical unit, wherein the controller includes: a plurality of host interfaces, one of which is connected to the host computer, a plurality of disk interfaces connected to a respective one of the storage devices, a plurality of first processors associated with a respective one of the host interfaces, a plurality of second processors connected to a respective one of the disk interfaces, and a cache memory, said method comprising:
upon receipt of a write request from the host computer at the one of the host interfaces, performing by one of the first processors associated with the host interface either one of first or second write operations in accordance with an operating rate of the first processor,
wherein the first write operations comprise checking whether there is a cache hit or a cache miss, and, if a cache hit has occurred, writing data along with the write request to an allocated area in the cache memory, and, if a cache miss has occurred, allocating an area in the cache memory and writing data into the allocated area, and sending a write completion notification to the host computer, and
wherein the second write operations comprise requesting another one of the first processors to check whether there is a cache hit or a cache miss, and if cache hit has occurred, writing data along with the write request to the allocated area in the cache memory, and if cache miss has occurred, allocating an area in the cache memory and writing data in the allocated area by the another one of the first processors, and if the another one of the first processors has completed the requested operations, sending a write completion notification to the host computer, and
wherein, if the operating rate of the first processor is less than or equal to the threshold, performing the first write operations by the one of the first processors associated the host interface, and otherwise performing the second write operations.

7. The method of exchanging data according to claim 6,
wherein upon receipt of a read request from the host computer at the host interface, performing either one of first or second read operations by the one of the first processors associated with the host interface in accordance with the operating rate of the first processor,
the first read operations comprise checking whether there is a cache hit or a cache miss, and if cache hit has occurred, reading data from the cache memory and sending the data to the host computer, and if cache miss has occurred, allocating an area in the cache memory, reading data from the storage devices, writing the data in the allocated area by the one of the first processors in the first read operation and sending the data to the host computer, and
the second read operations comprise requesting one of the second processors to check whether there is a cache hit or a cache miss, and if cache miss has occurred, allocating an area in the cache memory, reading data specified by the read request from the storage devices, writing the data specified by the read request in the allocated area by the second processor, and if the second processor has completed the requested operations, reading the data specified by the read request from the cache memory and sending the data specified by the read request to the host computer.

8. The method of exchanging data according to claim 7, wherein, if the operating rate of the first processor is less than or equal to the threshold, performing the first read operations by the one of the first processors associated the host interface, and otherwise performing the second read operations.

9. A method of exchanging data with a cache memory in a storage system, which is coupled to a host computer operative to generate write requests, that comprises a controller and a plurality of storage devices associated with a logical unit, wherein the controller includes: a plurality of host interfaces, one of which is connected to the host computer, a plurality of disk interfaces connected to a respective one of the storage devices, a plurality of first processors associated with a respective one of the host interfaces, a plurality of second processors connected to a respective one of the disk interfaces, and a cache memory, said method comprising:
upon receipt of a write request from the host computer at the one of the host interfaces, performing by one of the first processors different from the first processor associated with the host interface, instead of the first processor associated with the host interface, the steps of checking whether there is a cache hit or a cache miss, and if cache hit has occurred, writing data along with the write request to an area in the cache memory where has been allocated, and, if cache miss has occurred, allocating an area in the cache memory and writing data in the allocated area, wherein, if the operating rate of the one of the first processors that is different is less than or equal to a threshold, performing the first read operations by the one of the first processors associated the host interface, and otherwise performing the second read operations.

10. The method of exchanging data according to claim 9, wherein, upon receipt of a read request from the host computer at the host interface, performing by one of the second processors, instead of the first processor associated with the host interface, the steps of checking whether there is a cache hit or a cache miss, and if cache miss has occurred, allocating an area in the cache memory, reading data specified by the read request from the storage devices, and writing the data specified by the read request in the area allocated by the second processor.

* * * * *